(12) United States Patent
Yu et al.

(10) Patent No.: US 11,736,151 B2
(45) Date of Patent: Aug. 22, 2023

(54) METHODS OF JOINT OPERATION FOR EXTREMELY HIGH DOPPLER SHIFT ESTIMATION AND CONTROL CHANNEL FALSE POSITIVE RATE REDUCTION AND FOR SIDE-LINK V2X COMMUNICATIONS IN EXTREME HIGH SPEED SCENARIOS

(71) Applicant: Apple Inc., Cupertino, CA (US)

(72) Inventors: Zhibin Yu, Unterhaching (DE); Huiqiang Zhou, Beijing (CN)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 17/283,212

(22) PCT Filed: Sep. 27, 2019

(86) PCT No.: PCT/US2019/053332
§ 371 (c)(1),
(2) Date: Apr. 6, 2021

(87) PCT Pub. No.: WO2020/091921
PCT Pub. Date: May 7, 2020

(65) Prior Publication Data
US 2021/0391894 A1     Dec. 16, 2021

(30) Foreign Application Priority Data
Oct. 31, 2018   (WO) ................ PCT/CN2018/113054

(51) Int. Cl.
*H04B 7/01* (2006.01)
*H04B 17/309* (2015.01)
(Continued)

(52) U.S. Cl.
CPC .............. *H04B 7/01* (2013.01); *H04B 7/005* (2013.01); *H04B 17/309* (2015.01);
(Continued)

(58) Field of Classification Search
CPC ........ H04B 7/01; H04B 7/005; H04B 17/309; H04B 7/0413; H04B 7/0626;
(Continued)

(56) References Cited

U.S. PATENT DOCUMENTS 10,608,708 B2 *   3/2020   Park .................... H04L 5/004
10,932,122 B1 *   2/2021   Raghunathan .......... H04B 7/01
(Continued)

FOREIGN PATENT DOCUMENTS

WO   WO-2018044805 A1 *   3/2018   ............. H04B 15/00
WO   WO-2022164195 A2 *   8/2022   ............. H04L 5/0005

OTHER PUBLICATIONS

International Search Report and Written Opinion for PCT/US2019/053332, dated Sep. 27, 2019, 13 pages.

*Primary Examiner* — Lana N Le
(74) *Attorney, Agent, or Firm* — Kowert, Hood, Munyon, Rankin & Goetzel, P.C.

(57) ABSTRACT

A communication device includes one or more processors, configured to receive data representing each of at least a first waveform and a second waveform from a common control channel and data representing a third waveform from a data channel associated with the control channel; determine from the received data, channel state information for each of the first waveform and the second waveform; determine a Doppler shift between the channel state information for the first waveform and the channel state information for the second waveform; compare the determined Doppler shift to a predetermined Doppler shift threshold; and if the determined Doppler shift is less than the predetermined Doppler shift threshold, adjust the third received waveform by the determined Doppler shift and decode the adjusted third received waveform.

20 Claims, 18 Drawing Sheets

(51) Int. Cl.
*H04W 4/40* (2018.01)
*H04B 7/005* (2006.01)
*H04L 25/02* (2006.01)
*H04W 4/02* (2018.01)

(52) U.S. Cl.
CPC ......... *H04L 25/0202* (2013.01); *H04W 4/027* (2013.01); *H04W 4/40* (2018.02)

(58) Field of Classification Search
CPC ............ H04L 25/0202; H04L 25/0222; H04L 25/0204; H04L 27/2675; H04L 5/0051; H04L 5/004; H04L 25/0224; H04L 1/0069; H04L 5/0048; H04L 1/0026; H04L 1/1671; H04L 27/26136; H04L 43/16; H04W 4/027; H04W 4/40; H04W 52/325; H04W 72/20; H04W 48/12; H04W 4/44; H04W 74/002
See application file for complete search history.

(56) References Cited

U.S. PATENT DOCUMENTS

| | | | |
|---|---|---|---|
| 2013/0308510 A1* | 11/2013 | Ji | ................... H04B 7/0639 |
| 2016/0128014 A1 | 5/2016 | Xiaoding et al. | |
| 2017/0055273 A1* | 2/2017 | Sharma | ................... H04L 5/004 |
| 2017/0099175 A1* | 4/2017 | Tian | ................... H04L 25/0222 |
| 2018/0102825 A1 | 4/2018 | Kang et al. | |
| 2018/0123834 A1 | 5/2018 | Kim et al. | |
| 2018/0191416 A1 | 7/2018 | Palenius et al. | |
| 2018/0241508 A1 | 8/2018 | Chervyakov et al. | |
| 2018/0324815 A1* | 11/2018 | Nammi | ................... H04B 7/0626 |
| 2020/0343922 A1* | 10/2020 | Abdelmonem | ....... H04W 48/12 |
| 2021/0235342 A1* | 7/2021 | Zhu | ................... H04B 7/01 |

\* cited by examiner

*PSCCH Encoding stages:*

*PSCCH Modulation stages*

METHODS OF JOINT OPERATION FOR EXTREMELY HIGH DOPPLER SHIFT ESTIMATION AND CONTROL CHANNEL FALSE POSITIVE RATE REDUCTION AND FOR SIDE-LINK V2X COMMUNICATIONS IN EXTREME HIGH SPEED SCENARIOS

CROSS-REFERENCE TO RELATED APPLICATIONS

This application is a national stage application of International Application No. PCT/US2019/053332, filed on Sep. 27, 2019, titled "Methods of Joint Operation for Extremely High Doppler Shift Estimation and Control Channel False Positive Rate Reduction and for Side-Link V2x Communications in Extreme High Speed Scenarios", which claims priority to International Application No. PCT/CN2018/0113054, filed on Oct. 31, 2018, titled "Methods of Joint Operation for Extremely High Doppler Shift Estimation and Control Channel False Positive Rate Reduction and for Side-Link V2x Communications in Extreme High Speed Scenarios", which is hereby incorporated by reference in its entirety as though fully and completely set forth herein.

TECHNICAL FIELD

Various aspects of this disclosure generally relate to methods and devices for Doppler shift estimation and for control channel false positive rate reduction e.g., to be employed for sidelink Vehicle-to-Everything (V2X) communications in extreme high-speed scenarios.

BACKGROUND

Long Term Evolution (LTE) Vehicle-to-Vehicle (V2V) and Vehicle-to-Everything (V2X) technologies are proposed as potential candidates for communication between vehicles and between vehicles and any different entity that may affect a vehicle. Thereby, vehicle communication devices to this end included in corresponding vehicles may communicate with each other using V2X sidelink channels based on SC-FDMA modulation schemes. Using a sidelink connection, two vehicles may communicate directly with one another rather than relying on a conventional communication scheme. Such conventional schemes generally require the vehicles to communicate via an intermediary base station or network access point. In contrast, and by utilizing a sidelink connection, vehicles may establish direct lines of communication with other vehicles. Having thus a frame structure similar to the frame structure of the LTE uplink, the V2X sidelink also makes use of Demodulation Reference Signals (DMRS). To cope with potentially high relative velocities between V2X transmitters and receivers, a newly designed frame structure includes four DMRS symbols per sub-frame. The new sub-frame frame structure enables improved channel estimation performance in the time domain and allows for Doppler shift compensation at higher relative velocities within a Doppler shift capture range of ±2.3 kHz.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
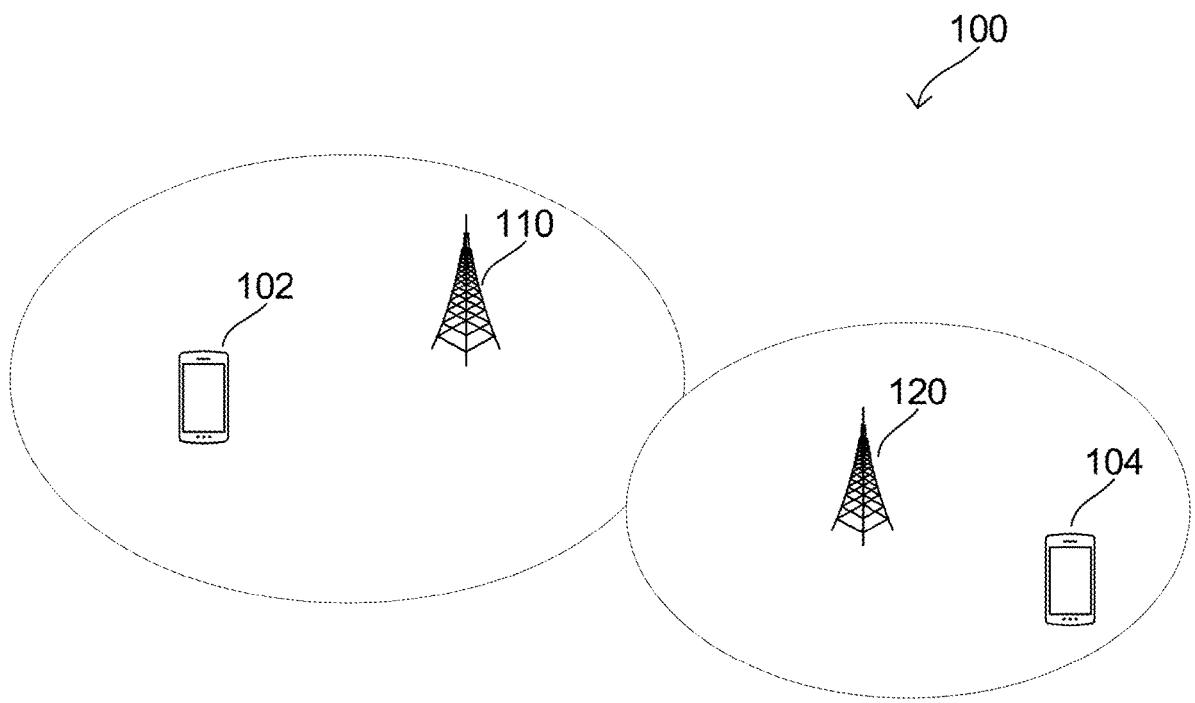
FIG. 1 shows an exemplary embodiment of a network architecture of a radio access network according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e., one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e., a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components, that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, mobile cells, and other movable network access nodes).

As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

The term "vehicular communication device" refers to any type of mobile machine or device or system that can communicate with other communication devices or systems. Vehicular communication devices may include dedicated communication components (for example in the manner of a terminal device, network access node, and/or relay node), that are configured to communicate with other communication devices such as terminal devices, network access nodes, and other vehicular communication devices. Vehicular communication devices can be terrestrial vehicles (e.g., automobiles, cars, trains, motorcycles, bicycles, utility vehicles, terrestrial drones or robots, or other land-based vehicles), aerospace vehicles (e.g., airplanes, helicopters, aerial drones, rockets, spacecraft, satellites, or other aeronautic or astronautic vehicles), and/or aquatic or sub-aquatic vehicles (e.g., boats, submarines, or other water/fluid-based vehicles). Vehicular communication devices may or may not transport passengers or cargo.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the aspects described herein may utilize include, but are not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication arrangement/Extended Total Access Communication arrangement (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11 ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short-Range Communications) communication arrangements such as Intelligent-Transport-Systems, and other existing, developing, or future radio communication technologies. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHz) where e.g., the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and e.g., 3GPP NR (New Radio), which can include allocating the OFDM carrier data bit vectors to the corresponding symbol resources.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network" and "wireless network" as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations. The term "channel state information" is used herein to refer generally to the wireless channel for a wireless transmission between one or more transmitting antennas and one or more receiving antennas and may take into account any factors that affect a wireless transmission such as, but not limited to, path loss, interference, and/or blockage.

FIG. 1 shows exemplary radio communication network 100 according to some aspects, which may include terminal devices 102 and 104 (examples of communication devices) in addition to network access nodes 110 and 120. Radio communication network 100 may communicate via network access nodes 110 and 120 with terminal devices 102 and 104 via various mechanisms.

In an exemplary cellular context, network access nodes 110 and 120 may be base stations (e.g., base stations, NodeBs, Base Transceiver Stations (BTSs), or any other type of base station), while terminal devices 102 and 104 may be cellular terminal devices (e.g., Mobile Stations (MSs), User Equipments (UEs), any type of wearable device capable of wireless communication, or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 122 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control servers, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

Figure 2:
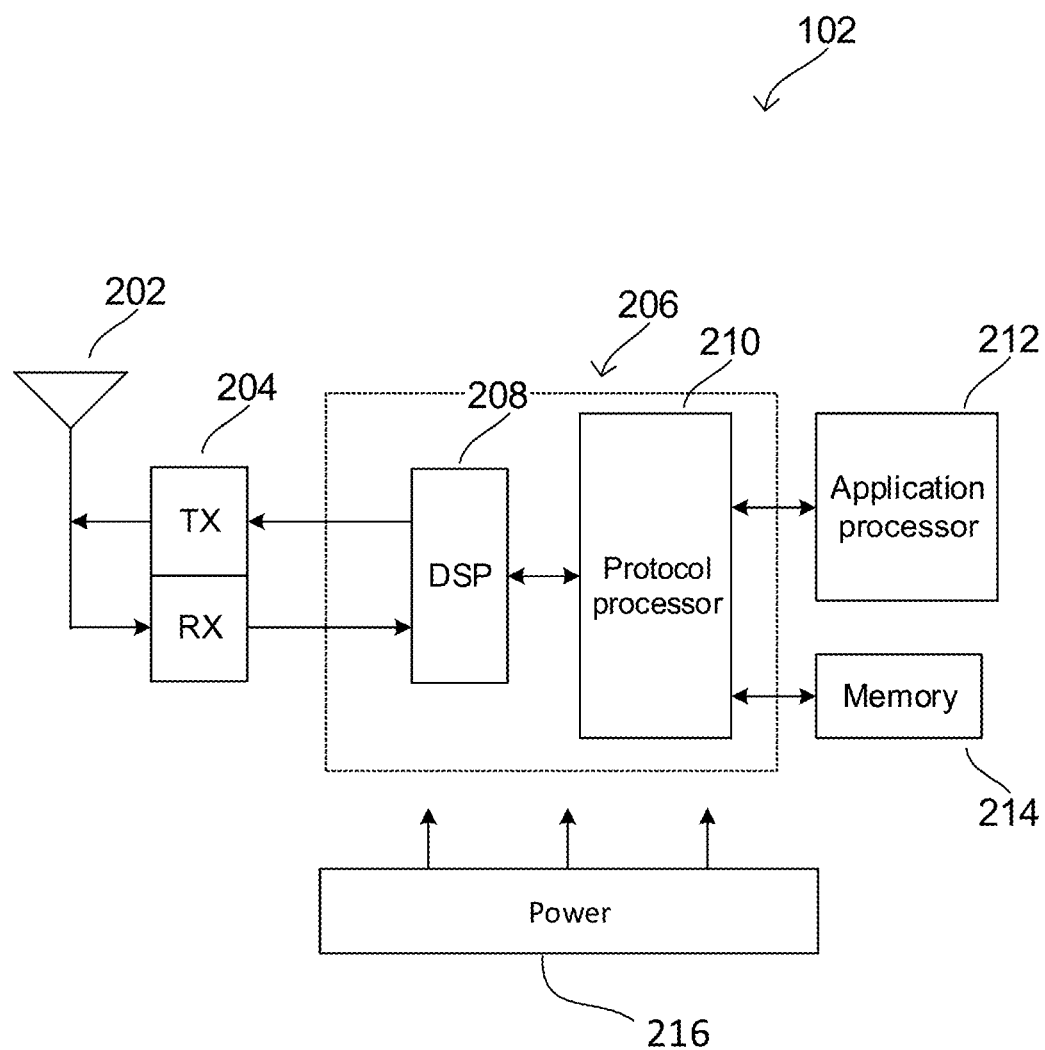
FIG. 2 shows an exemplary internal configuration of a terminal device according to some aspects.

The radio access network and core network (if applicable, such as for a cellular context) of radio communication network 100 may be governed by radio communication technology protocols (or, equivalently, standard) that can vary depending on the specifics of radio communication network 100. Such radio communication technology protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined radio communication technology protocols to transmit and receive data over the radio access network domain of radio communication network 100, while the core network may follow the defined radio communication technology protocols to route data within and outside of the core network. Exemplary radio communication technology protocols include LTE, UMTS, GSM, WiMAX, Bluetooth, WiFi, mmWave, etc., any of which may be applicable to radio communication network 100. FIG. 2 shows an exemplary internal configuration of terminal device 102 (an exemplary communication device) according to some aspects, which may include antenna system 202, radio frequency (RF) transceiver 204, baseband modem 206 (including digital signal processor 208 and controller 210), application processor 212, memory 214, and power supply 216. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to baseband samples. In the transmit (TX) path, RF transceiver 204 may receive baseband samples from baseband modem 206 and perform analog and digital RF front-end processing on the baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by controller 210 for transmission via RF transceiver 204, and, in the receive path, prepare incoming received data provided by RF transceiver 204 for processing by controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that algorithmically defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions. The one or more processors of digital signal processor 208 may offload certain processing tasks to these dedicated hardware circuits, which are referred to herein as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may implement lower-layer (e.g., Layer 1/PHY) processing functions of the radio communication technologies, while controller 210 may implement upper-layer protocol stack functions (e.g., Data Link Layer/Layer 2 and Network Layer/Layer 3). Controller 210 may thus implement controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Controller 210 may be structurally embodied as a protocol processor configured to execute protocol software (retrieved from a controller memory) and subsequently control the radio communication components of terminal device 102 to transmit and receive communication signals in accordance with the corresponding protocol control logic defined in the protocol software. Controller 210 may include one or more processors configured to retrieve and execute program code that algorithmically defines the upper-layer protocol stack logic for one or more radio communication technologies, which can include Data Link Layer/Layer 2 and Network Layer/Layer 3 functions. Controller 210 may be configured to perform both user-plane and control-plane functions to facilitate the transfer of application layer data to and from terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 210 may include executable instructions that algorithmically defines these functions.

In some aspects, terminal device 102 may be configured to transmit and receive data according to multiple radio communication technologies. Accordingly, in some aspects one or more of antenna system 202, RF transceiver 204, digital signal processor 208, and controller 210 may include separate components or instances dedicated to different radio communication technologies and/or unified components that are shared between different radio communication technologies. For example, in some aspects controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and controller 210 are shown as individual components in FIG. 2, in some aspects antenna system 202, RF transceiver 204, digital signal processor 208, and/or controller 210 can encompass separate components dedicated to different radio communication technologies.

Terminal device 102 may also include application processor 212, memory 214, and power supply 216. Application processor 212 may be a CPU, and may be configured to handle the layers above the protocol stack, including the transport and application layers.

Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce baseband samples, which digital signal processor may provide to RF transceiver 204. RF transceiver 204 may then process the baseband samples to convert the baseband samples to analog radio signals, which RF transceiver 204 may wirelessly transmit via antenna system 202. In the receive path, RF transceiver 204 may receive analog radio signals from antenna system 202 and process the analog radio signals to obtain baseband samples. RF transceiver 204 may provide the baseband samples to digital signal processor 208, which may perform physical layer processing on the baseband samples. Digital signal processor 208 may then provide the resulting data to controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface. Although shown separately in FIG. 2, in some aspects controller 210 and application processor 212 may be implemented as one or more processors that execute program code defining both protocol stack and application layer functions. The depiction of FIG. 2 thus shows the functional separation between the protocol stack and application layer without limiting implementations to being separate or unified.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, and other storage uses.

Power supply 216 may be an electrical power source that provides power to the various electrical components of terminal device 102. Depending on the design of terminal device 102, power supply 216 may be a 'definite' power source such as a battery (e.g., rechargeable or disposable) or an 'indefinite' power source such as a wired electrical connection. Operation of the various components of terminal device 102 may thus pull electrical power from power supply 216.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area (one or more of which can be overlapping or mutually exclusive), terminal devices 102 and 104 may be configured to select and re-select between the available network access nodes to maintain a suitable radio access connection with the radio access network of radio communication network 100. For example, terminal device 102 may establish a radio access connection with network access node 110 while terminal device 104 may establish a radio access connection with network access node 114. In the event that the current radio access connection degrades, terminal devices 104 or 106 may seek a new radio access connection with another network access node of radio communication network 100. For example, terminal device 104 may move from the coverage area of network access node 114 into the coverage area of network access node 110. As a result, the radio access connection with network access node 114 may degrade, which terminal device 104 may detect via radio measurements such as signal strength or signal quality measurements of network access node 114. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover, are established in the various network protocols and may be employed by terminal devices and the radio access network to maintain suitable radio access connections between each terminal device and the radio access network across any number of different radio access network scenarios.

Figure 3:
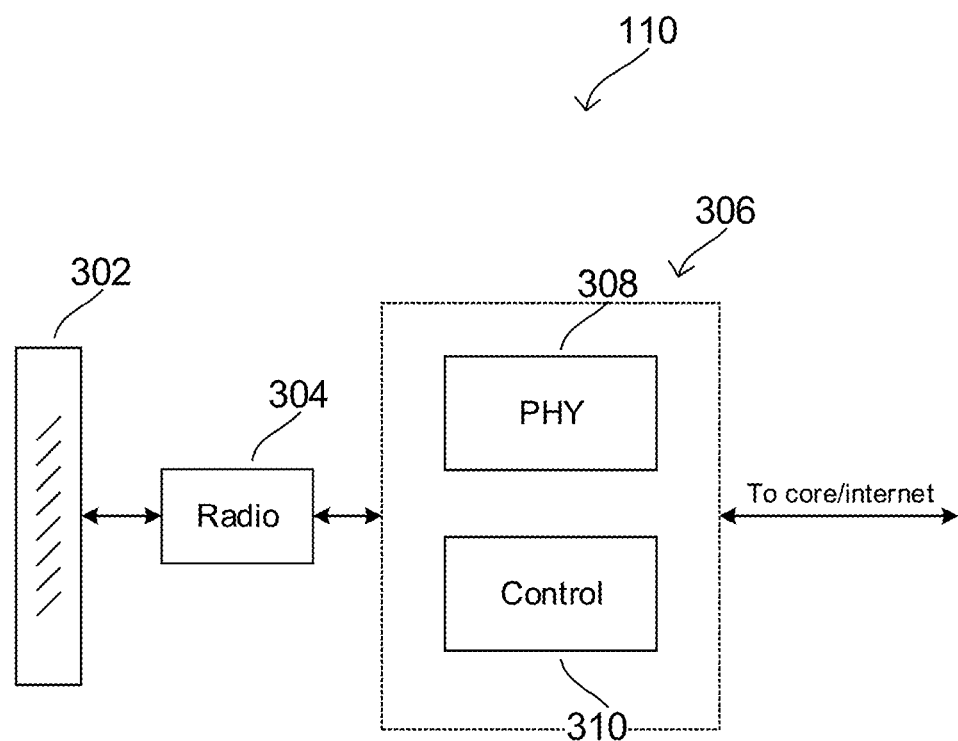
FIG. 3 shows an exemplary internal configuration of a network access node according to some aspects.

FIG. 3 shows an exemplary internal configuration of a network access node, such as network access node 110, according to some aspects. As shown in FIG. 3, network access node 110 may include antenna system 302, radio transceiver 304, and baseband subsystem 306 (including physical layer processor 308 and controller 310). In an abridged overview of the operation of network access node 110, network access node 110 may transmit and receive wireless signals via antenna system 302, which may be an antenna array including multiple antennas. Radio transceiver 304 may perform transmit and receive RF processing to convert outgoing baseband samples from baseband subsystem 306 into analog radio signals to provide to antenna system 302 for radio transmission and to convert incoming analog radio signals received from antenna system 302 into baseband samples to provide to baseband subsystem 306. Physical layer processor 308 may be configured to perform transmit and receive PHY processing on baseband samples received from radio transceiver 304 to provide to controller 310 and on baseband samples received from controller 310 to provide to radio transceiver 304. Controller 310 may control the communication functionality of network access node 110 according to the corresponding radio communication technology protocols, which may include exercising control over antenna system 302, radio transceiver 304, and physical layer processor 308. Each of radio transceiver 304, physical layer processor 308, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 304 may be a radio transceiver including digital and analog radio frequency processing and amplification circuitry. In some aspects, radio transceiver 304 may be a software-defined radio (SDR) component implemented as a processor configured to execute software-defined instructions that specify radio frequency processing routines. In some aspects, physical layer processor 308 may include a processor and one or more hardware accelerators, wherein the processor is configured to control physical layer processing and offload certain processing tasks to the one or more hardware accelerators. In some aspects, controller 310 may be a controller configured to execute software-defined instructions that specify upper-layer control functions. In some aspects, controller 310 may be limited to radio communication protocol stack layer functions, while in other aspects controller 310 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

Figure 4:
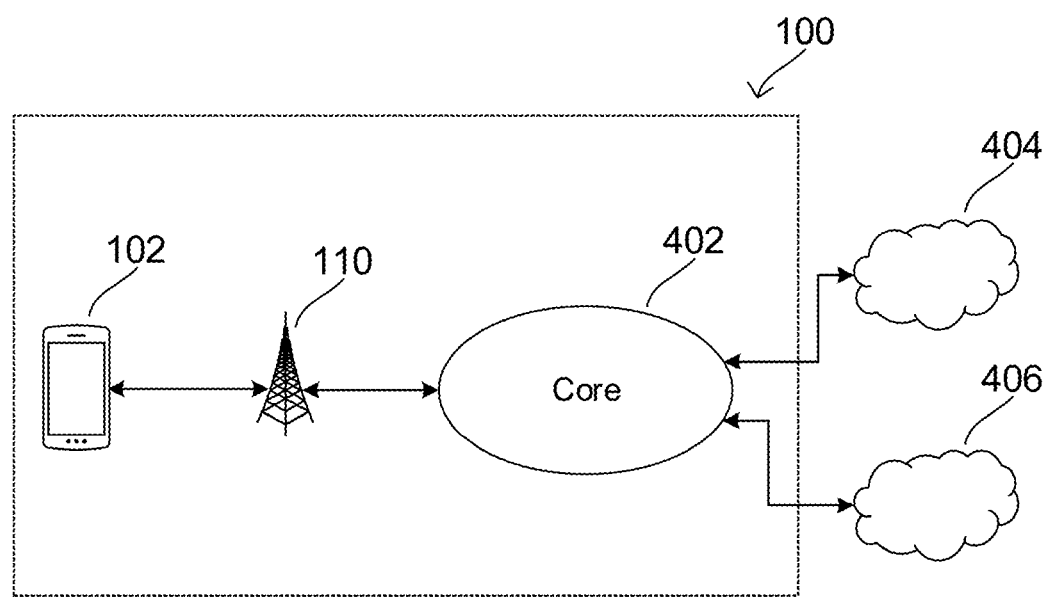
FIG. 4 shows an exemplary network architecture of a radio access network, core network, and external data networks according to some aspects.

As previously indicated, network access nodes 112 and 114 may interface with a core network. FIG. 4 shows an exemplary configuration in accordance with some aspects where network access node 110 interfaces with core network 402, which may be, for example, a cellular core network. Core network 402 may provide a variety of functions to manage operation of radio communication network 100, such as data routing, authenticating and managing users/subscribers, interfacing with external networks, and various other network control tasks. Core network 402 may therefore provide an infrastructure to route data between terminal device 104 and various external networks such as data network 404 and data network 406. Terminal device 104 may thus rely on the radio access network provided by network access node 110 to wirelessly transmit and receive data with network access node 110, which may then provide the data to core network 402 for further routing to external locations such as data networks 404 and 406 (which may be packet data networks (PDNs)). Terminal device 104 may therefore establish a data connection with data network 404 and/or data network 406 that relies on network access node 110 and core network 402 for data transfer and routing.

Figure 5:
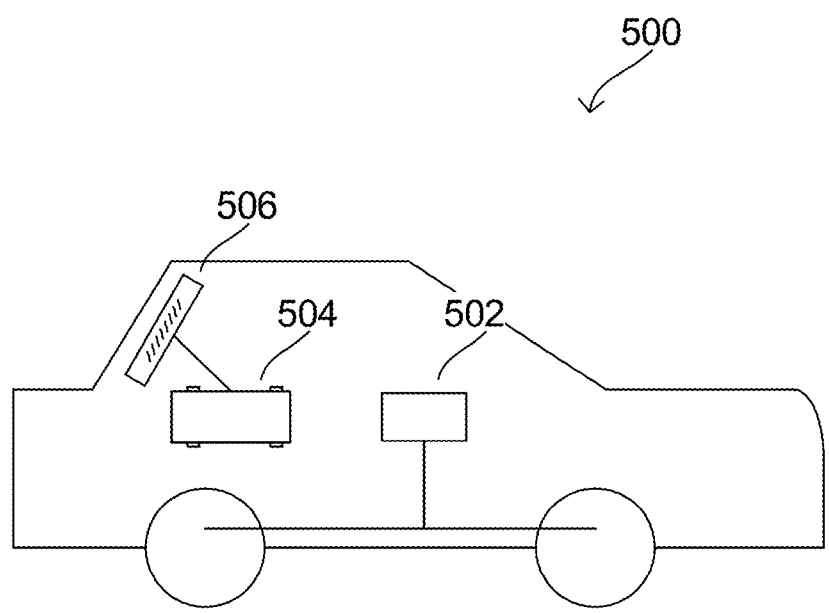
FIG. 5 shows an exemplary internal configuration of a vehicular communication device according to some aspects.

Terminal devices may in some cases be configured as vehicular communication devices (i.e., as exemplary communication devices). FIG. 5 shows an exemplary internal configuration of a vehicular communication device 500 according to some aspects. As shown in FIG. 5, vehicular communication device 500 may include steering and movement system 502, radio communication arrangement 504, and antenna system 506. The internal components of vehicular communication device 500 may be arranged around a vehicular housing of vehicular communication device 500, mounted on or outside of the vehicular housing, enclosed within the vehicular housing, or any other arrangement relative to the vehicular housing where the internal components move with vehicular communication device 500 as it travels. The vehicular housing, such as an automobile body, plane or helicopter fuselage, boat hull, or similar type of vehicular body dependent on the type of vehicle that vehicular communication device 500 is. Steering and movement system 502 may include components of vehicular communication device 500 related to steering and movement of vehicular communication device 500. In some aspects where vehicular communication device 500 is an automobile, steering and movement system 502 may include wheels and axles, an engine, a transmission, brakes, a steering wheel, associated electrical circuitry and wiring, and any other components used in the driving of an automobile. In some aspects where vehicular communication device 500 is an aerial vehicle, steering and movement system 502 may include one or more of rotors, propellers, jet engines, wings, rudders or wing flaps, air brakes, a yoke or cyclic, associated electrical circuitry and wiring, and any other components used in the flying of an aerial vehicle. In some aspects where vehicular communication device 500 is an aquatic or sub-aquatic vehicle, steering and movement system 502 may include any one or more of rudders, engines, propellers, a steering wheel, associated electrical circuitry and wiring, and any other components used in the steering or movement of an aquatic vehicle. In some aspects, steering and movement system 502 may also include autonomous driving functionality, and accordingly, may also include a central processor configured to perform autonomous driving computations and decisions and an array of sensors for movement and obstacle sensing. The autonomous driving components of steering and movement system 502 may also interface with radio communication arrangement 504 to facilitate communication with other nearby vehicular communication devices and/or central networking components that perform decisions and computations for autonomous driving.

Radio communication arrangement 504 and antenna system 506 may perform the radio communication functionalities of vehicular communication device 500, which can include transmitting and receiving communications with a radio communication network and/or transmitting and receiving communications directly with other vehicular communication devices and terminal devices. For example, radio communication arrangement 504 and antenna system 506 may be configured to transmit and receive communications with one or more network access nodes, such as, in the exemplary context of DSRC and LTE V2V/V2X, RSUs and base stations.

Figure 6:
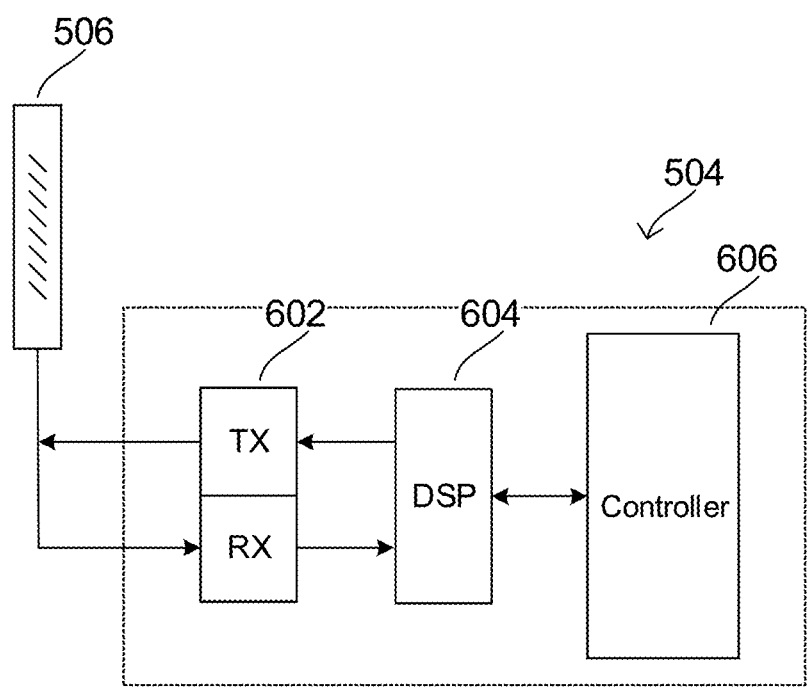
FIG. 6 shows an exemplary internal configuration of an antenna system and communication arrangement of a vehicular communication device according to some aspects.

FIG. 6 shows an exemplary internal configuration of antenna system 506 and radio communication arrangement 504 according to some aspects. As shown in FIG. 6, radio communication arrangement 504 may include RF transceiver 602, digital signal processor 604, and controller 606. Although not explicitly shown in FIG. 6, in some aspects radio communication arrangement 504 may include one or more additional hardware and/or software components (such as processors/microprocessors, controllers/microcontrollers, other specialty or generic hardware/processors/circuits, etc.), peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Controller 606 may implement execution of upper-layer protocol stack functions, while digital signal processor 604 may implement physical layer processing. RF transceiver 602 may implement RF processing and amplification related to transmission and reception of wireless radio signals via antenna system 506.

Antenna system 506 may be a single antenna or an antenna array that includes multiple antennas. Antenna system 506 may additionally include analog antenna combination and/or beamforming circuitry. In the receive (RX) path, RF transceiver 602 may receive analog radio signals from antenna system 506 and perform analog and digital RF front-end processing on the analog radio signals to produce baseband samples (e.g., In-Phase/Quadrature (IQ) samples) to provide to digital signal processor 604. In some aspects, RF transceiver 602 can include analog and digital reception components such as amplifiers (e.g., a Low Noise Amplifiers (LNAs)), filters, RF demodulators (e.g., RF IQ demodulators)), and analog-to-digital converters (ADCs), which RF transceiver 602 may utilize to convert the received radio signals to baseband samples. In the transmit (TX) path, RF transceiver 602 may receive baseband samples from digital signal processor 604 and perform analog and digital RF front-end processing on the baseband samples to produce analog radio signals to provide to antenna system 506 for wireless transmission. In some aspects, RF transceiver 602 can include analog and digital transmission components such as amplifiers (e.g., Power Amplifiers (PAs), filters, RF modulators (e.g., RF IQ modulators), and digital-to-analog converters (DACs) to mix the baseband samples received from baseband modem 206, which RF transceiver 602 may use to produce the analog radio signals for wireless transmission by antenna system 506.

Digital signal processor 604 may be configured to perform physical layer (PHY) transmission and reception processing to, in the transmit path, prepare outgoing transmit data provided by controller 606 for transmission via RF transceiver 602, and, in the receive path, prepare incoming received data provided by RF transceiver 602 for processing by controller 606. Digital signal processor 604 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 604 may include one or more processors configured to retrieve and execute program code that algorithmically defines control and processing logic for physical layer processing operations. In some aspects, digital signal processor 604 may execute processing functions with software via the execution of executable instructions. In some aspects, digital signal processor 604 may include one or more hardware accelerators, where the one or more processors of digital signal processor 604 may offload certain processing tasks to these hardware accelerators. In some aspects, the processor and hardware accelerator components of digital signal processor 604 may be realized as a coupled integrated circuit.

While digital signal processor 604 may implement lower-layer physical processing functions, controller 606 may implement upper-layer protocol stack functions. Controller 606 may include one or more processors configured to retrieve and execute program code that algorithmically defines the upper-layer protocol stack logic for one or more radio communication technologies, which can include Data Link Layer/Layer 2 and Network Layer/Layer 3 functions. Controller 606 may be configured to perform both user-plane and control-plane functions to facilitate the transfer of application layer data to and from radio communication arrangement 504 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 606 may include executable instructions that define the logic of such functions.

In some aspects, controller 606 may be coupled to an application processor, which may handle the layers above the protocol stack including transport and application layers. The application processor may act as a source for some outgoing data transmitted by radio communication arrangement 504 and a sink for some incoming data received by radio communication arrangement 504. In the transmit path, controller 606 may therefore receive and process outgoing data provided by the application processor according to the layer-specific functions of the protocol stack, and provide the resulting data to digital signal processor 604. Digital signal processor 604 may then perform physical layer processing on the received data to produce baseband samples, which digital signal processor may provide to RF transceiver 602. RF transceiver 602 may then process the baseband samples to convert the baseband samples to analog radio signals, which RF transceiver 602 may wirelessly transmit via antenna system 506. In the receive path, RF transceiver 602 may receive analog radio signals from antenna system 506 and process the analog RF signal to obtain baseband samples. RF transceiver 602 may provide the baseband samples to digital signal processor 604, which may perform physical layer processing on the baseband samples. Digital signal processor 604 may then provide the resulting data to controller 606, which may process the resulting data according to the layer-specific functions of the protocol stack and provide the resulting incoming data to the application processor.

Figure 7:
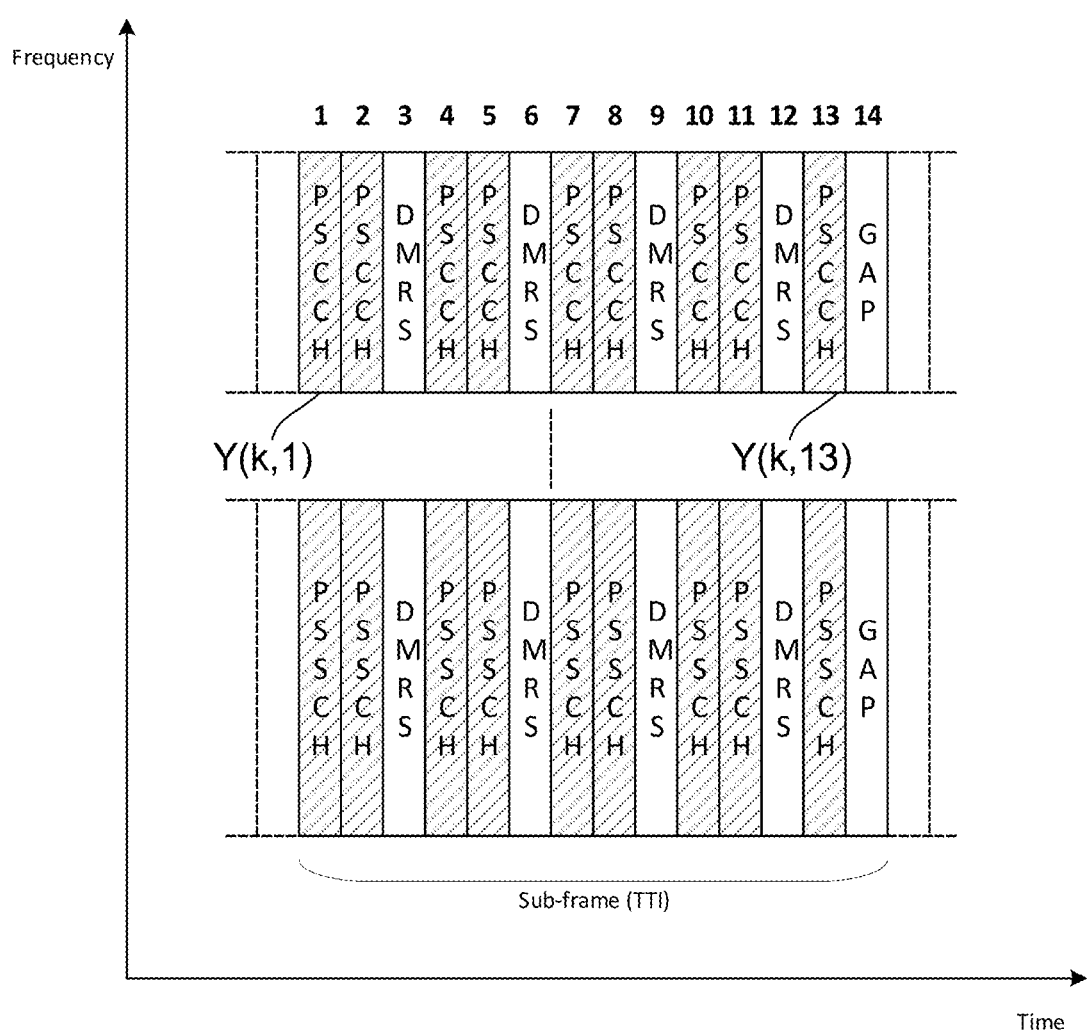
FIG. 7 shows an exemplary V2X-sub-frame structure for one user in accordance with some aspects.

In some aspects, radio communication arrangement 504 may be configured to transmit and receive data according to multiple radio communication technologies. Accordingly, in some aspects one or more of antenna system 506, RF transceiver 602, digital signal processor 604, and controller 606 may include separate components or instances dedicated to different radio communication technologies and/or unified components that are shared between different radio communication technologies. For example, in some aspects controller 606 may be configured to execute multiple protocol stacks, each dedicated to a different radio communication technology and either at the same processor or different processors. In some aspects, digital signal processor 604 may include separate processors and/or hardware accelerators that are dedicated to different respective radio communication technologies, and/or one or more processors and/or hardware accelerators that are shared between multiple radio communication technologies. In some aspects, RF transceiver 602 may include separate RF circuitry sections dedicated to different respective radio communication technologies, and/or RF circuitry sections shared between multiple radio communication technologies. In some aspects, antenna system 506 may include separate antennas dedicated to different respective radio communication technologies, and/or antennas shared between multiple radio communication technologies. Accordingly, while antenna system 506, RF transceiver 602, digital signal processor 604, and controller 606 are shown as individual components in FIG. 6, in some aspects antenna system 506, RF transceiver 602, digital signal processor 604, and/or controller 606 can encompass separate components dedicated to different radio communication technologies. FIG. 7 shows an exemplary frame structure for sidelink V2X communications in accordance with various aspects of the present disclosure. As illustrated in FIG. 7, in various aspects, the Physical Sidelink Control Channel (PSCCH) and an associated Physical Sidelink Shared Channel (PSSCH) are transmitted simultaneously within a same V2X sub-frame or transmission time interval (TTI) on respective radio resources, i.e., time and frequency resource elements. Exemplarily, FIG. 7 explicitly indicates temporal positions of frequency-domain PSCCH data-subcarrier signals Y(k,1) and Y(k,13) on resource element index k and PSCCH data symbol indices 1 and 13 that may be received at any one of communication devices 102, 104 or 500. An explicit indication of Y(k, 1) for data symbol indices 2, 4, 5, 7, 8, 10 and 11 (at positions 2, 4, 5, 7, 8, 10 and 11) has been omitted for conciseness of the figure. While FIG. 7 shows time-multiplexed data symbols (in the figure at positions 1, 2, 4, 5, 7, 8, 10, 11, 13) of one sidelink control channel (PSCCH) and corresponding time-multiplexed data symbols (similarly at positions 1, 2, 4, 5, 7, 8, 10, 11, 13) of a corresponding sidelink data channel (PSSCH) for one user only, in various aspects PSCCHs and associated PSSCHs for a larger number (in exemplary aspects up to 20) users may be transmitted within one sub-frame in the illustrated manner.

As mentioned above, since V2X communication technology is to be used for communication including e.g., vehicle-to-vehicle communication, potentially large Doppler shifts resulting from potentially high relative velocities have to be compensated. In order to cope with high Doppler shifts, a current proposal for a V2X frame structure as illustrated in FIG. 7 includes four DMRS symbols (in the figure at positions 3, 6, 9, 12) interspaced between respective PSCCH/PSSCH data symbols per sub-frame. As compared for example to an LTE case with only two DMRS symbols per sub-frame, a correspondingly reduced spacing in time allows for an enhanced Doppler shift estimation capture range. With current Doppler shift estimation e.g., based on phase rotation measurements of two adjacent DMRS symbols a Doppler shift estimation capture range of ±2.3 kHz becomes feasible. However, in extreme cases a relative velocity between vehicles may be as large as 500 km/h corresponding to Doppler shifts of ±2.7 kHz in the respective sidelink communication bands.

In addition to Doppler shifts exceeding a maximum Doppler shift estimation capture range, e.g., in V2X communications, a rate of events in which a blindly decoded signal passes a Cyclic Redundancy Check (CRC) even though no PSCCH codeword is included in the decoded signal may be large. This rate being referred to as false positive rate may be expected to be large e.g., for a V2X sidelink control channel as in this case a communication device is required to blindly decode a large number (e.g., up to 20) of control channels per sub-frame within a given resource pool.

Various aspects of the present disclosure employ Doppler shift estimation based on the Physical Sidelink Control Channel (PSCCH) where a communication device includes an extractor configured to extract a received waveform of payload data including at least first payload data and second payload from a received radio signal. In various aspects of the present disclosure, the first payload data and the second payload data may respectively correspond to data symbols of a Physical Sidelink Control Channel (PSCCH), and may in various aspects correspond to a pair of temporally adjacent PSCCH symbols adjacent to one or two Demodulation Reference Signal (DMRS) symbols. In accordance with various aspects of the present disclosure, the communication device further includes a payload data processor configured to reconstruct a transmission waveform of the first payload data and a transmission waveform of the second payload data.

To this end, in various aspects, the payload data processor may first demodulate and decode the received radio signal to generate demodulated and decoded payload data. In various aspects, this payload data may correspond to Sidelink Control Information (SCI). The communication device may in certain aspects include a redundancy checker, e.g., configured to perform a Cyclic Redundancy Check (CRC), to confirm or discard the decoded payload data. In various aspects, the payload data processor may further be configured to re-encode and re-modulate the extracted payload data to reconstruct the transmission waveform of the first payload data and the transmission waveform of the second payload data. In this way, the payload data processor may reconstruct clean PSCCH data subcarrier signals on the transmitter side, i.e., PSCCH data subcarrier signals without the influence of transmission channel and noise.

In accordance with various aspects of the present disclosure, the communication device further includes a channel estimator configured to estimate a channel transfer function for each of the first payload data and the second payload data, based on the reconstructed transmission waveform and the extracted received waveform. The channel estimator may thus in certain aspects compare the received sub-carrier signals of the PSCCH with the reconstructed (cleaned) sub-carrier signals of the PSCCH on a symbol basis to thereby determine a channel transfer function for at least each of the first and second payload data, respectively, which in various aspects correspond to respective symbols of the PSCCH.

In accordance with various aspects of the present disclosure, the communication device further includes a phase difference determiner configured to determine a phase difference between the channel transfer function estimated for the first payload data and the channel transfer function estimated for the second payload data. In certain aspects, the communication device may further include a Doppler shift determiner configured to determine a Doppler shift based on the determined phase difference. Further, in certain aspects, the communication device may further include a compensator configured to compensate a Doppler shift of a waveform extracted from a second radio resource selected from the predefined radio resources and different from the first radio resource based on the determined Doppler shift. In other words, in certain aspects, the Doppler shift determined based on PSCCH symbols may be employed to apply Doppler shift compensation on received waveforms of a Physical Sidelink Shared Channel (PSSCH) associated to the PSCCH (the associated PSCCH and PSSCH being transmitted within a same sub-frame on different frequency resources dedicated to a particular communication device). With reference to FIG. 7, a Doppler shift determined based on phase differences between channel transfer functions estimated for any one of the PSCCH symbol pairs at positions 1,2 or 4,5, or 7,8 or 10,11 in FIG. 7, for any combination of these pairs or for all of these pairs is used for Doppler shift compensation for the associated PSSCH (i.e., the PSCCH that can be demodulated and decoded based grant information included in the associated PSCCH).

In accordance with various aspects, Doppler shift estimation based on PSCCH pairs takes into account the fact that the V2X control channel (PSCCH) has a higher coding rate than the V2X data channel (PSSCH) and is therefore more robust against Doppler shift. In addition, as can be taken from FIG. 7, the density of directly adjacent PSCCH symbols (pairs at positions 1, 2; 4,5; 7,8; 10, 11 in FIG. 7) in time is three times higher than the density of two adjacent DMRS symbols. Therefore, a Doppler shift estimation capture range is three times higher as compared to a case of the Doppler shift estimation based on the DMRS symbols. This range can be calculated to be up to ±7 kHz in various aspects which is sufficient to cope with the above-described extreme case of extreme relative velocity where a Doppler shift can be within ±2.7 kHz.

Figure 8:
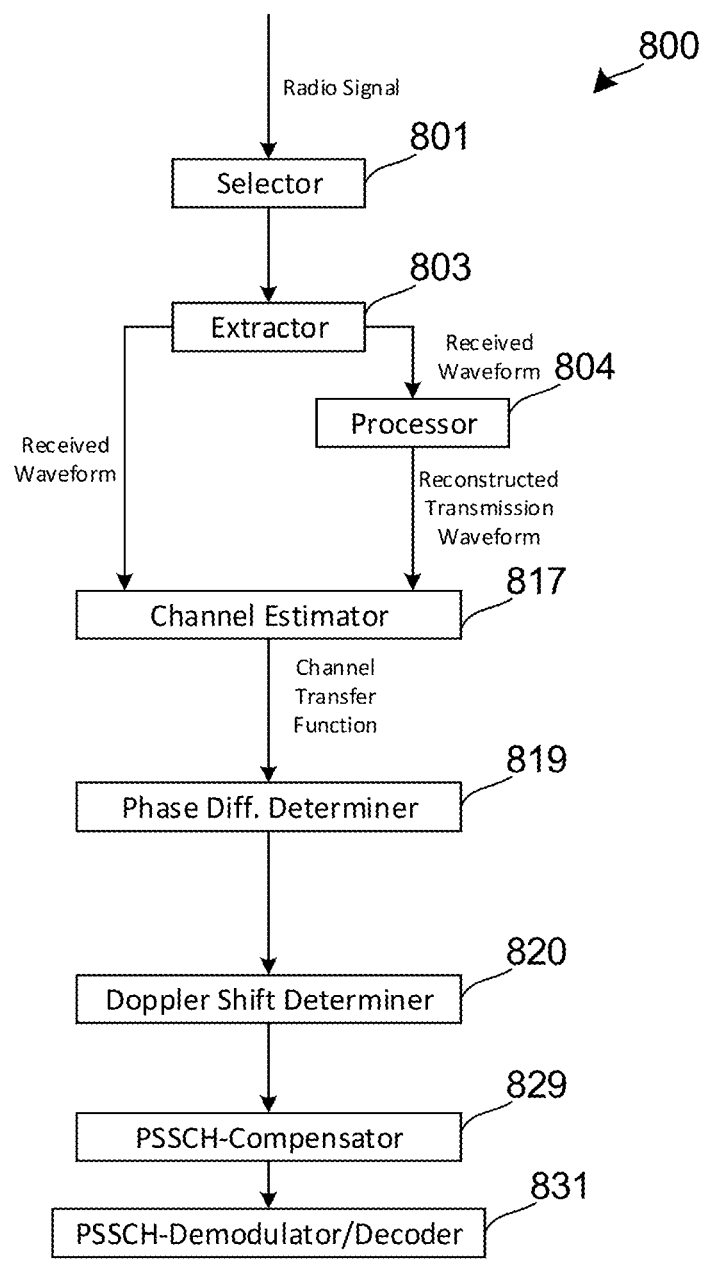
FIG. 8 shows an exemplary internal configuration of a communication device related to Doppler shift estimation and control channel false positive rate reduction in accordance with various aspects.

FIG. 8 shows an exemplary internal configuration of a communication device 800 related to Doppler shift estimation in accordance with various aspects of the present disclosure. Thereby, communication device 800 may in various aspects correspond to a terminal device as described in the context of FIG. 2 above or to a vehicular communication device as described above in the context of FIG. 5. The components of the communication device 800 illustrated in FIG. 8 may in various aspects be incorporated in or may be part of the baseband modem 206 of the terminal device 102 shown in FIG. 2. Alternatively, the components of communication device 800 shown in FIG. 8 may be incorporated in or may be part of digital signal processor 604 of radio communication arrangement 504 of a vehicular communication device according to some aspects. As shown in FIG. 8, the communication device 800 may in some aspects include selector 801, extractor 803, payload data processor 804, channel estimator 817, phase difference determiner 819, Doppler shift determiner 820, PSSCH-compensator 829 and PSSCH-demodulator/decoder 831. Each of selector 801, extractor 803, payload data processor 804, channel estimator 817, phase difference determiner 819, Doppler shift determiner 820, PSSCH-compensator 829 and PSSCH-demodulator/decoder 831 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. While selector 801, extractor 803, payload data processor 804, channel estimator 817, phase difference determiner 819, Doppler shift determiner 820, PSSCH-compensator 829 and PSSCH-demodulator/decoder 831 are shown separately in FIG. 8, this depiction generally serves to highlight the operation of baseband modem 206 or DSP 604 on a functional level. Selector 801, extractor 803, payload data processor 804, channel estimator 817, phase difference determiner 819, Doppler shift determiner 820, PSSCH-compensator 829 and PSSCH-demodulator/decoder 831 can therefore each be implemented as separate hardware and/or software components, or one or more of selector 801, extractor 803, payload data processor 804, channel estimator 817, phase difference determiner 819, Doppler shift determiner 820, PSSCH-compensator 829 and PSSCH-demodulator/decoder 831 can be combined into a unified hardware and/or software component (for example, a hardware-defined circuitry arrangement including circuitry to perform multiple functions, or a processor configured to execute program code that defines instructions for multiple functions).

The communication device 800 may in various aspects be configured to receive a radio signal from at least one base station (e.g., from at least one of base stations 110, 120 discussed above). In such aspects, communication device 800 may be configured to communicate with the at least one base station for example in a V2X non-autonomous operation mode with the at least one base station performing central control of radio communications. In different aspects, the communication device 800 may be configured to receive a radio signal from at least one further communication device, e.g., in a V2X autonomous operation mode without a base station performing a central control of radio communications. The latter case also referred in certain aspects as side-link V2X communication, may rely on a radio signal including control channels (PSCCHs) and data channels (PSSCHs) of plural (in certain exemplary aspects up to 20) communication devices. Thereby, e.g., control channels are included in the radio signal using predefined radio resources from a corresponding pool of predefined radio resources.

As will be explained in more detail in the following, in various aspects, the selector 801 is configured to select a radio resource from the predefined radio resources, e.g., predefined frequency resources. In this way, the selector 801 may in various aspects be configured to select a PSCCH candidate. While not explicitly depicted in the figure, a radio frequency (RF) transceiver 204 of terminal device 102 or RF transceiver 602 of radio communication arrangement 504 in various aspects may be configured to receive radio signal. The extractor 803 may thus be configured to extract a received waveform of payload data (e.g., the PSCCH symbols at positions 1, 2, 4, 5, 7, 8, 10, 11, 13) including first payload data and second payload data which in various aspect of the present disclosure may respectively correspond to payload data of the PSCCH. In certain aspects, the first and second payload data may correspond to any one of the PSCCH symbol pairs at positions 1,2 or 4,5, or 7,8 or 10,11 in FIG. 7. Thus, first payload data may in certain aspects correspond to any one of the PSCCH symbols at position 1 or 4 or 7 or 10 in FIG. 7, while second payload data may in certain aspects correspond to any one of the PSCCH symbols at a temporally adjacent position. As further illustrated in FIG. 8, based on the extracted received waveform of each of the first and second payload data, the processor 804 may in various aspects be configured to reconstruct a respective transmission waveform of the first payload data and the second payload data.

The communication device 800 further includes a channel estimator 817 which is configured to estimate a channel transfer function for each of the first payload data and the second payload data, based on the reconstructed transmission waveform and the extracted received waveform. The communication device 800 further includes a phase difference determiner 819 configured to determine a phase difference between the channel transfer function estimated for the first payload data and the channel transfer function estimated for the second payload data.

In accordance with certain aspects, the communication device 800 further includes a Doppler shift determiner 820 configured to determine a Doppler shift based on the determined phase difference. Further, the communication device 800 further includes a PSSCH compensator 829 configured to compensate a Doppler shift of a waveform of payload data extracted from a second radio resource selected from the predefined radio resources and different from the first radio resource, based on the determined Doppler shift. Thereby, in various aspects, the payload data of the second waveform may correspond to payload data of a PSSCH associated with the selected PSCCH. For example, the payload data may correspond to the PSSCH data symbols at positions 1, 2, 4, 5, 7, 8, 10, 11, 13 making up the PSSCH associated to the PSCCH made up of the PSCCH data symbols at positions 1, 2, 4, 5, 7, 8, 10, 11, 13 in FIG. 7. The communication device 800 further includes a PSSCH demodulator/decoder configured to demodulate and decode the received waveform of payload data extracted from the second radio resource selected from the predefined radio resources and different from the first radio resource.

Figure 9:
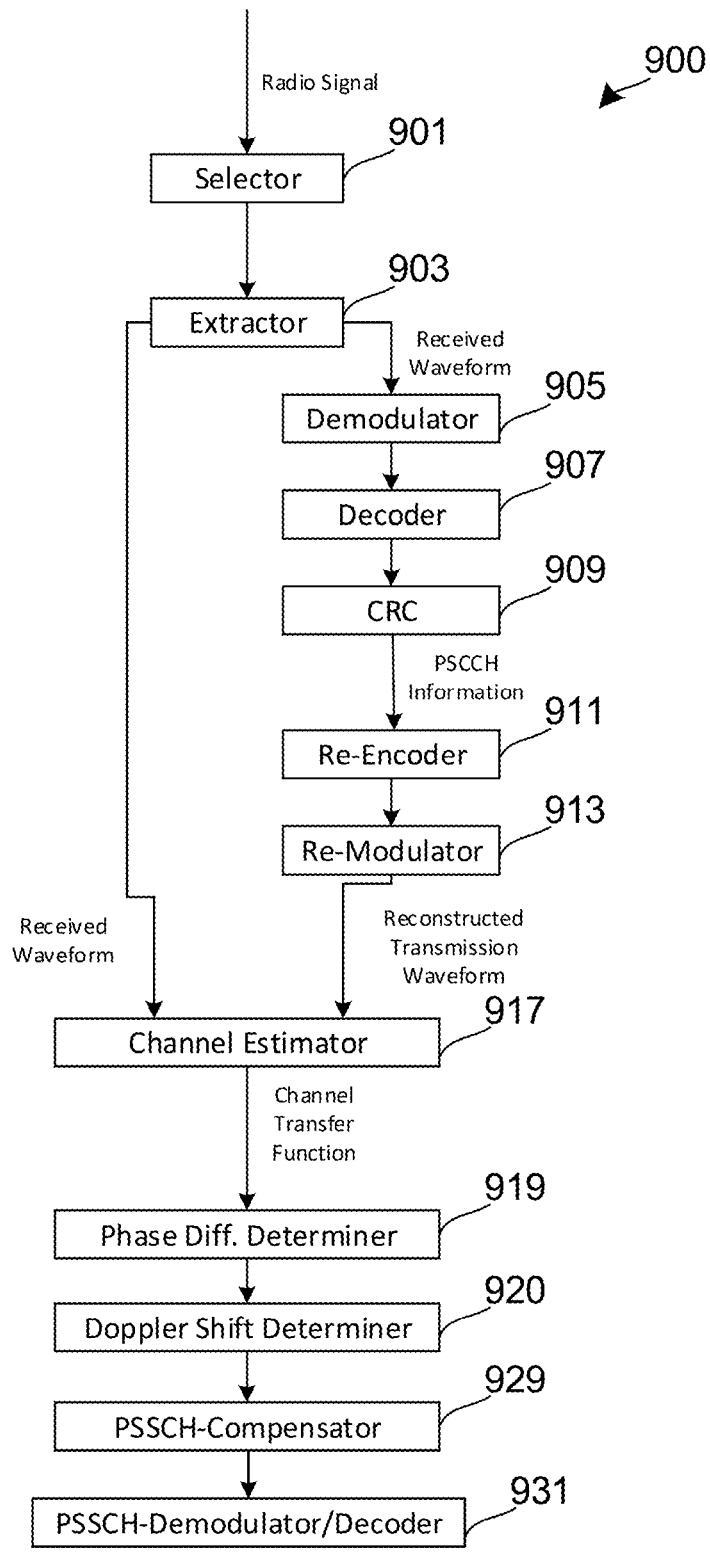
FIG. 9 shows an exemplary internal configuration of a communication device related to Doppler shift estimation and control channel false positive rate reduction in accordance with various aspects.

FIG. 9 shows a communication device 900 corresponding to the communication device 800 of FIG. 8, where all corresponding components are those of the communication device of FIG. 8 and where the payload data processor 804 of FIG. 8 is represented by its components in form of a demodulator 905, a decoder 907, a redundancy checker CRC 909, a re-encoder 911 and a re-modulator 913. An explicit description of selector 901, extractor 903, channel estimator 917, phase difference determiner 919, Doppler shift determiner 920, PSSCH-compensator 929 and of PSSCH-demodulator/decoder 931 is omitted here for conciseness purposes. Each of demodulator 905, decoder 907, redundancy checker CRC 909, re-encoder 911 and re-modulator 913 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. While demodulator 905, decoder 907, redundancy checker CRC 909, re-encoder 911 and re-modulator 913 are shown separately in FIG. 9, this depiction generally serves to highlight the operation of baseband modem 206 or DSP 604 on a functional level. Demodulator 905, decoder 907, redundancy checker CRC 909, re-encoder 911 and re-modulator 913 can therefore each be implemented as separate hardware and/or software components, or one or more of demodulator 905, decoder 907, redundancy checker CRC 909, re-encoder 911 and re-modulator 913 can be combined into a unified hardware and/or software component (for example, a hardware-defined circuitry arrangement including circuitry to perform multiple functions, or a processor configured to execute program code that defines instructions for multiple functions).

Figure 10:
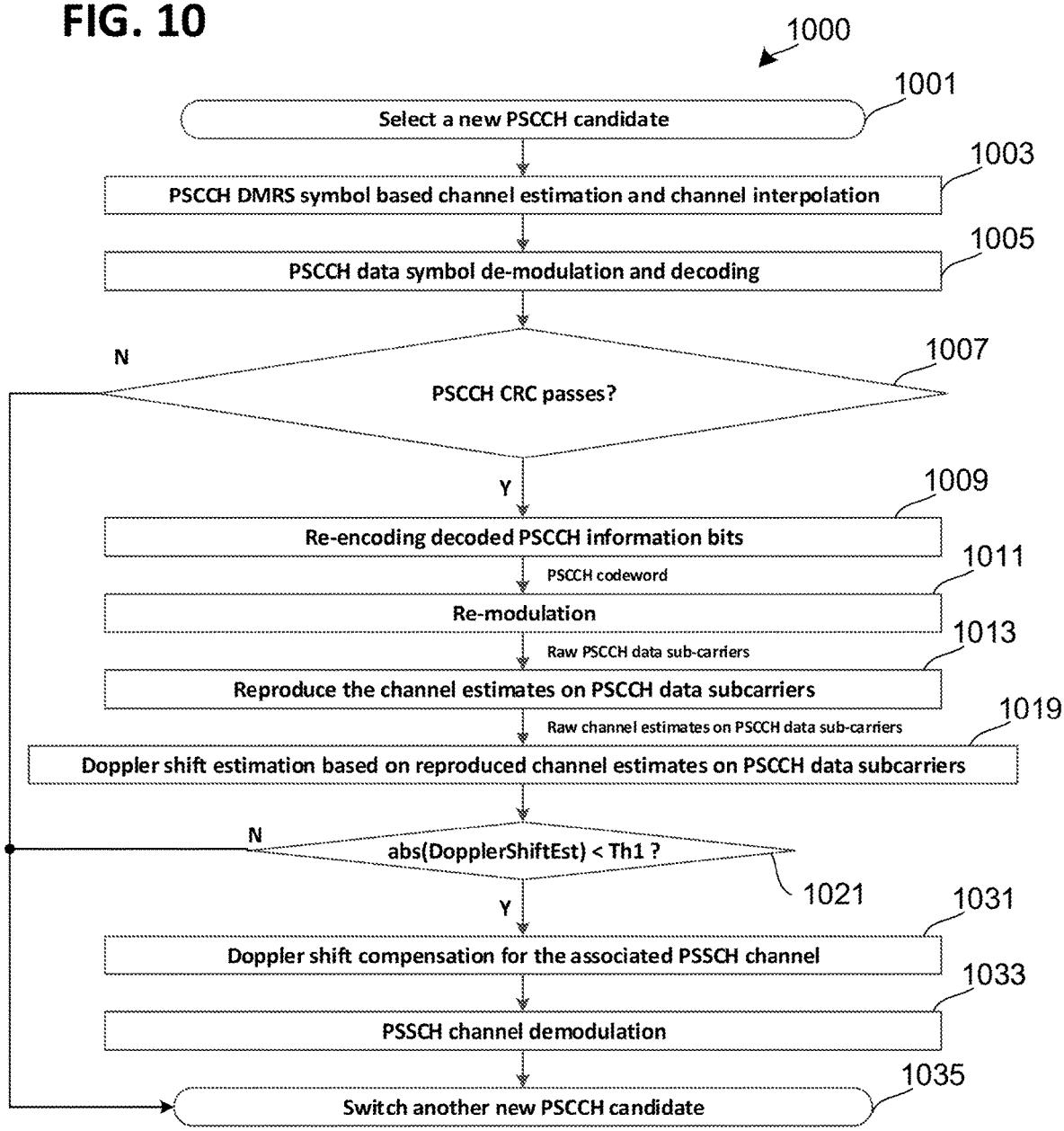
FIG. 10 shows an exemplary method which the communication device may execute in accordance with some aspects using the internal configuration shown in FIG. 8 or FIG. 9.

FIG. 10 shows exemplary method 1000, which communication device 900 may execute using the internal configuration shown in FIG. 9. As illustrated, at stage 1001, the selector 901 and the extractor 903 may cooperate to select a new PSCCH candidate where the extractor 903 is configured to extract a received waveform of payload data (in various aspects PSCCH payload data) from a first radio resource selected from predefined radio resources. In other words, the selector 903 may select a first radio resource, e.g., a radio resource of a PSCCH based on which the extractor then extracts a received waveform from an entire received radio signal which in certain aspects may contain up to 20 PSCCHs of respective communication devices, each included based on a respectively dedicated radio resource.

In certain aspects, extractor 903 may be configured to perform PSCCH DMRS symbol-based channel estimation and channel interpolation at stage 1003. Subsequently, at stage 1005, demodulator 905 and decoder 907 may then demodulate and decode the data sub-carrier signals of the selected received PSCCH candidate to generate corresponding PSCCH information bits, i.e., Sidelink Control Information (SCI). This control information may include corresponding grant information for the PSSCH associated with the selected PSCCH candidate based on which communication device 900 may determine whether or not and how to decode the associated PSSCH.

When performing the demodulation, demodulator 905 may in accordance with certain aspects take into account an initial Doppler shift estimation based on adjacent PSCCH DMRS symbols. Alternatively, demodulator 905 may in accordance with certain aspects perform an initial (rough) Doppler shift estimation using a single DMRS symbol by employing time-domain windowing or frequency-domain filtering of two different time portions of a single PSCCH DMRS symbol and by evaluating phase differences between the two-time portions to estimate the Doppler shift.

Turning back to FIG. 10, at stage 1007, redundancy checker CRC 909 checks if the SCI has been decoded correctly. In accordance with certain aspects, to this end, redundancy checker CRC 909 may employ a cyclic redundancy check (CRC). As illustrated, if in one case the decoded PSCCH candidate (the SCI candidate) does not pass the test, the candidate is discarded ("N" at stage 1007) and the method directly proceeds to stage 1035 where another new PSCCH candidate is selected.

Figure 11:
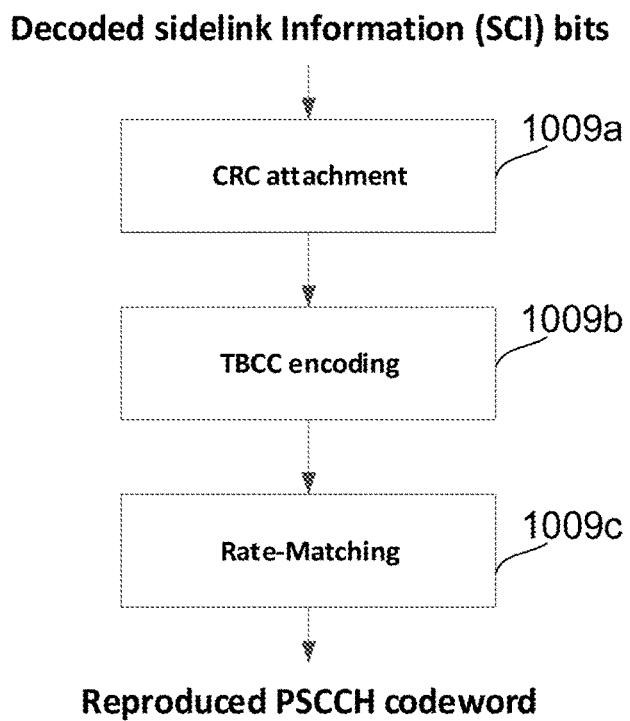
FIG. 11A shows exemplary PSCCH encoding stages in accordance with various aspects that may be executed by a re-encoder of FIG. 9.
FIG. 11B shows exemplary PSCCH modulation stages in accordance with various aspects that may be executed by a re-modulator of FIG. 9.
Figure 11:
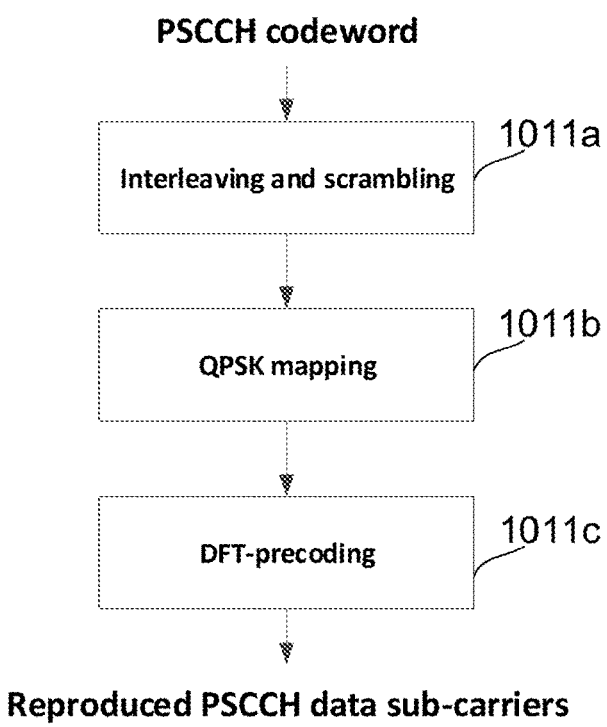

In the other case, if the decoded PSCCH candidate passes the test ("Y" at stage 1007), method 1000 continues at stage 1009, where the re-encoder 911 re-encodes the decoded PSCCH information bits. Subsequently, re-modulator 913 re-modulates the resulting reconstructed PSCCH codeword at stage 1011. FIG. 11A exemplarily illustrates Re-Encoding performed by re-encoder 911 in accordance with certain aspects. As shown, re-encoder 911 firstly may perform CRC attachment at stage 1009a, may then perform encoding e.g., based on Tail-biting convolutional codes (TBCC) at stage 1009b, and may perform rate matching at stage 1009c. Thus, employing PSCCH encoding stages on the decoded received PSCCH data at the communication device 900 (receiver side) in a way as employed at the transmitter side, the re-encoder 911 (re-) generates a clean PSCCH codeword, i.e., a codeword without noise.

Based thereon, FIG. 11B exemplarily illustrates Re-Modulation performed by re-modulator 913 in accordance with certain aspects. As shown, re-modulator 913 performs Interleaving and scrambling at stage 1011a, performs modulation, e.g., QPSK mapping, at stage 1011b, and performs DFT-precoding in accordance with SC-FDMA employed in V2X-communication at stage 1011c. Thus, employing PSCCH modulation stages on the re-encoded PSCCH codeword at the communication device 900 (receiver side) in a way as employed at the transmitter side, the re-modulator 913 (re-)generates clean PSCCH data sub-carrier signals, i.e., data sub-carrier signals without noise.

In this way, re-encoder 911 and re-modulator 913 are configured to reconstruct the PSSCH transmission waveforms (clean PSCCH data sub-carrier signals at the transmission side). In accordance with various aspects, the Re-modulator 913 is configured to perform the re-modulation for each symbol of the PSCCH, i.e., for respective payload data. In accordance with various aspects, the re-modulator 913 is thus configured to reconstruct the PSCCH transmission waveforms, i.e., the clean PSCCH data sub-carrier signals on the transmission side, for at least two-time adjacent PSCCH data symbols (first and second payload data). As mentioned, such time adjacent PSCCH data symbol pairs (payload data pairs) may in certain aspects be PSCCH payload data at position 1 and PSCCH payload data at position 2, or PSCCH payload data at position 4 and PSCCH payload data at position 5, or PSCCH payload data at position 7 and PSCCH payload data at position 8, or PSCCH payload data at position 10 and PSCCH payload data at position 11, as exemplarily illustrated in FIG. 7 (each pair being an example of first and second payload data).

With further reference to FIG. 10, channel estimator 917 uses the clean PSCCH data sub-carrier signals reproduced at stages 1009, 1011, i.e., the PSCCH data sub-carrier signals without noise to reproduce channel estimates on PSCCH data sub-carriers. To this end, in accordance with various aspects, channel estimator 917 is configured to apply the reconstructed clean PSCCH data sub-carrier signals on the received PSCCH data sub-carrier signals by estimating the channel transfer function H(k,l) using the following equation:

$$\hat{H}(k, l) = \frac{Y(k, l)}{\hat{X}(k, l)}, \quad (1)$$

where X (k,l) is the frequency-domain reconstructed clean PSCCH data-subcarrier signal on resource element index k in PSCCH data symbol index/from stage 1011, and Y (k,l) is the frequency-domain PSCCH data-subcarrier signal on resource element index k and PSCCH data symbol index/received at communication device 900. The phase difference determiner 919 is configured to determine a phase difference between the channel transfer function estimated for a first PSCCH data symbol (e.g., first payload data at position 1, 4, 7, or 10 in FIG. 7) and the channel transfer function estimated for a second PSCCH data symbol temporarily adjacent to the first PSCCH data symbol (e.g., second payload data at position 2, 5, 8, or 11 in FIG. 7). Having determined such phase difference for at least one pair of adjacent PSCCH data symbols, the Doppler shift determiner 920 may then estimate a corresponding Doppler shift.

In accordance with various aspects, phase differences may be determined for all pairs of adjacent PSCCH data symbols included in one sub-frame or TTI. In the exemplary case of four such pairs as illustrated in FIG. 7, the phase differences can be combined to calculate a Doppler shift Δf as follows:

$$\Delta f = \frac{\arg\left\{\sum_{l=\{1,4,7,10\}} \sum_{k=1}^{M} \{\hat{H}(k, l) \cdot conj(\hat{H}(k, l+1))\}\right\}}{-2\pi \cdot L} \quad (2)$$

where M is the number of PSCCH resource elements per SCFDM symbol, which in various aspects may be fixed to be 24 as e.g., defined for side-link V2X. L is the time duration of a single side-link V2X SCFDM symbol, which may in various aspects be 71 μs. The mathematical operator "conj" in equation (2) refers to the complex conjugate and applied on a complex number, the mathematical "arg" function returns the phase angle of the complex number in the complex plane. In the above equation (2), the exemplary case of four pairs with respective first payload data or first PSCCH data symbol indices l={1, 4, 7, 10} can be extended to larger numbers or smaller numbers of payload data pairs with respective larger or smaller groups of indices.

As the arg function in the denominator of equation (2) returns values within the interval [−π, +π], it follows from equation (2) above that Doppler shifts within a range of $$\Delta f \in \left[-\frac{1}{2 \cdot L}, +\frac{1}{2 \cdot L}\right] = [-7 \text{ kHz}, +7 \text{ kHz}] \quad (3)$$

can be estimated. In other words, Doppler shift estimation in accordance with various aspects of the present disclosure allows for a Doppler shift estimation capture range theoretically within −7 kHz to +7 kHz, which allows to cope with relative velocities e.g., between V2X transmitters/receivers even higher than the above-mentioned extreme case of 500 km/h which corresponds to ±2.7 kHz.

In certain aspects, it may be possible to reproduce channel estimates on PSCCH data sub-carriers, i.e., based on the received PSCCH payload data waveforms and the re-constructed PSCCH payload data transmission waveforms, further taking into account channel transfer functions estimated from received DMRS waveforms. In such aspects, further taking into account also channel transfer functions estimated from received DMRS waveforms may be useful for improving estimation sensitivity in low SINR conditions.

For example, in such aspects, it may be possible to average SINR measurements from channel transfer functions based on PSCCH data sub-carriers and from channel transfer functions based on DMRS symbols. Further, in such aspects it may be possible to enhance Doppler shift estimation by adapting equation (2) to equation (2.1):

$$\Delta f = \frac{\arg\left\{\sum_{l=\{1,2,3,4,5,6,7,8,9,10,11,12\}} \sum_{k=1}^{M} \{\hat{H}(k,l) \cdot conj(\hat{H}(k,l+1))\}\right\}}{-2\pi \cdot L} \quad (2.1)$$

As can be taken from the sub-frame structure illustrated in FIG. 7 above, symbol indices 3, 6, 9, 12 may in various aspects correspond to the DMRS symbols such that for l=3, 6, 9, 12, the channel transfer estimates H(k,l) are channel transfer estimates from DMRS symbols.

The ability to estimate Doppler shifts also for above extreme relative velocities may in certain aspects offer a possibility to include a filter function. As illustrated in FIG. 10, at stage 1021, the Doppler shift determiner may be configured to compare an absolute value of the estimated Doppler shift to a first threshold Th1. As illustrated, if the determined Doppler shift is found to be larger than the first threshold Th1, the processing directly proceeds with stage 1035 and another PSCCH candidate is selected. In other words, a PSSCH associated to the current PSCCH is discarded if an estimated Doppler shift is found to correspond to an unrealistically high relative velocity (e.g., beyond 500 km/h). Thus, Doppler shift estimation in accordance with various aspects of the present disclosure may allow for an additional filter to determine the current PSCCH candidate to be a false positive, i.e., to have passed the CRC check at stage even though no SCI signal bits are included in the processed signal. Discarding the current PSCCH candidate, in various aspects, the communication device is configured to also discard the PSSCH candidate associated to the discarded PSCCH candidate.

In accordance with various aspects, the first threshold Th1 can be set for example to a value of ±3 kHz, i.e., to ±2.7 kHz corresponding to an extreme case of a relative velocity of 500 km/h plus a practical estimation error of ±0.3 kHz. By setting the first threshold Th1 in this way, the false positive PSCCH rate can be reduced by (7−3)/7, i.e., by 57%. The first threshold Th1 be relaxed, i.e., increased, in case of low SNR conditions. Thus, in certain aspects, the first threshold Th1 can be run-time determined taking into account SNR estimation based on PDCCH DMRS and/or taking into account SNR estimation from re-produced channel estimates on PSCCH data-subcarriers.

With further reference to FIG. 10, if at stage 1021 the determined Doppler shift is found to be within the realistic range, this Doppler shift is used by the PSSCH-compensator 929 for Doppler shift compensation for the associated PSSCH channel at stage 1031. Thereby, Doppler shift compensation is applied to received waveforms received on sub-carriers of the PSSCH associated with the present PSCCH candidate. Subsequently, the so compensated PSSCH can be demodulated and decoded at stage 1033 by PSSCH-demodulator/decoder 931 and the method proceeds at stage 1035 with a switch to another new PSCCH candidate.

While in various aspects Doppler estimation may be based on first and second payload data corresponding to PSCCH data symbols and may be employed to compensate for Doppler shifts of a received waveform of an associated PSSCH, in certain aspects first and second payload data may correspond to PSCCH data symbols or PSSCH data symbols, the Doppler shift estimation being employed to compensate Doppler shifts in a subsequent sub-frame for the same communication device.

Figure 12:
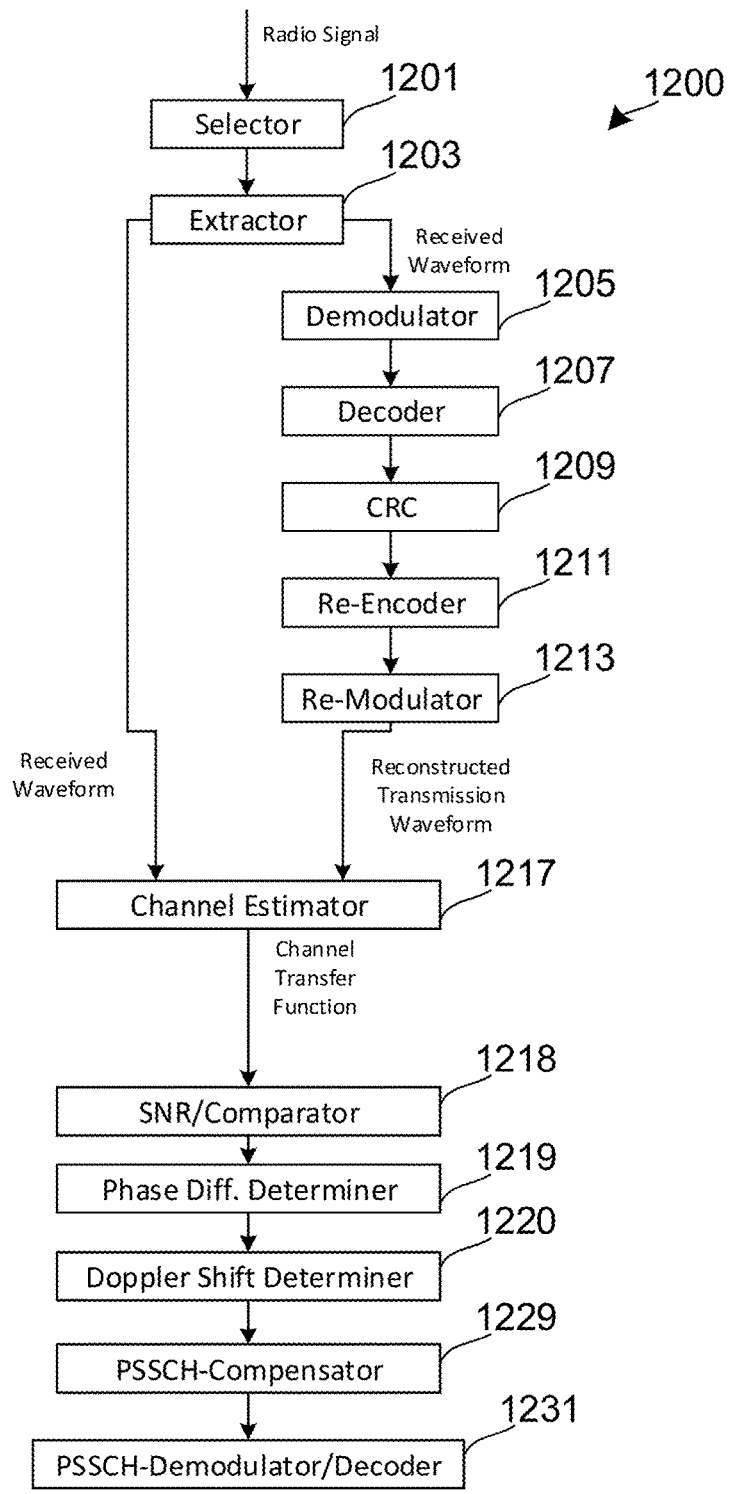
FIG. 12 shows an exemplary internal configuration of a communication device related to Doppler shift estimation and control channel false positive rate reduction in accordance with various aspects.

FIG. 12 shows a communication device 1200 corresponding to the communication device 900 of FIG. 9, where components correspondingly labelled correspond to those described above in the context of FIG. 9. In other words, an explicit description of selector 1201, extractor 1203, demodulator 1205, decoder 1207, redundancy checker CRC 1209, re-encoder 1211, re-modulator 1213, channel estimator 1217, phase difference determiner 1219, Doppler shift determiner 1220, PSSCH-compensator 1229 and of PSSCH-demodulator/decoder 1231 is omitted here for conciseness purposes. In addition to the components illustrated in FIG. 9, a communication device 1200 may in accordance with various aspects of the present disclosure further include an SNR-determiner/comparator 1218.

The SNR-determiner/comparator 1218 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. While the SNR-determiner/comparator 1218 is shown as a single component in FIG. 12, this depiction generally serves to highlight the operation of baseband modem 206 or DSP 604 on a functional level. SNR-determiner/comparator 1218 can therefore be implemented as separate hardware and/or software components, or SNR-determiner/comparator 1218 can be combined into the shown unified hardware and/or software component (for example, a hardware-defined circuitry arrangement including circuitry to perform multiple functions, or a processor configured to execute program code that defines instructions for multiple functions).

Figure 13:
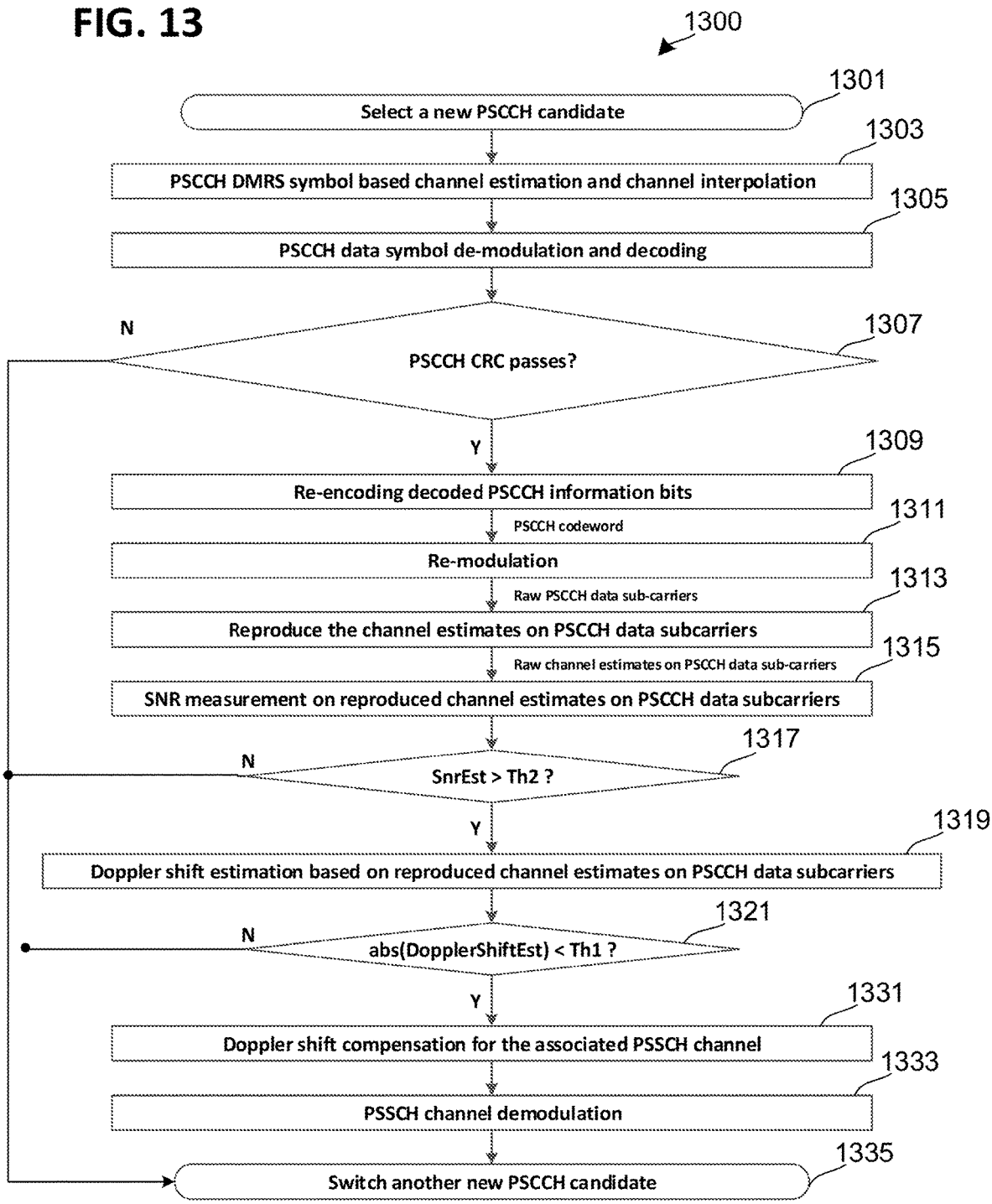
FIG. 13 shows an exemplary method which the communication device may execute in accordance with some aspects using the internal configuration shown in FIG. 12.

FIG. 13 shows exemplary method 1300, which communication device 1200 may execute using the internal configuration shown in FIG. 12. Stages correspondingly labelled correspond to those described above in the context of FIG. 10. In other words, an explicit description of stages 1301, 1303, 1305, 1307, 1309, 1311, 1313, 1319, 1321, 1331, 1333, 1335 corresponding to stages 1001, 1003, 1005, 1007, 1009, 1011, 1013, 1019, 1021, 1031, 1033, 1035 described in the context of FIG. 10 above is omitted here for conciseness purposes.

As shown in FIG. 13, the SNR-determiner/comparator 1218 determines a Signal-to-Noise-Ratio (SNR) based on at least one of the channel transfer functions estimated by channel estimator 1217 (as described in the context of FIG. 10 at stage 1013) at stage 1315 and compares the determined SNR to a second threshold Th2 at stage 1317. In various aspects, the SNR-determiner/comparator 1218 may be configured to determine the Signal-to-Noise-Ratio (SNR) based on at least one of the channel transfer functions estimated by channel estimator 1217 (as described in the context of FIG. 10 at stage 1013) at stage 1315 and in addition based on at least one channel transfer function estimated from at least one received Demodulation Reference Signal (DMRS) waveform. In other words, in such aspects, the channel estimator 1217 may be further configured to estimate at least one channel transfer function from at least one received DMRS waveform.

Figure 14:
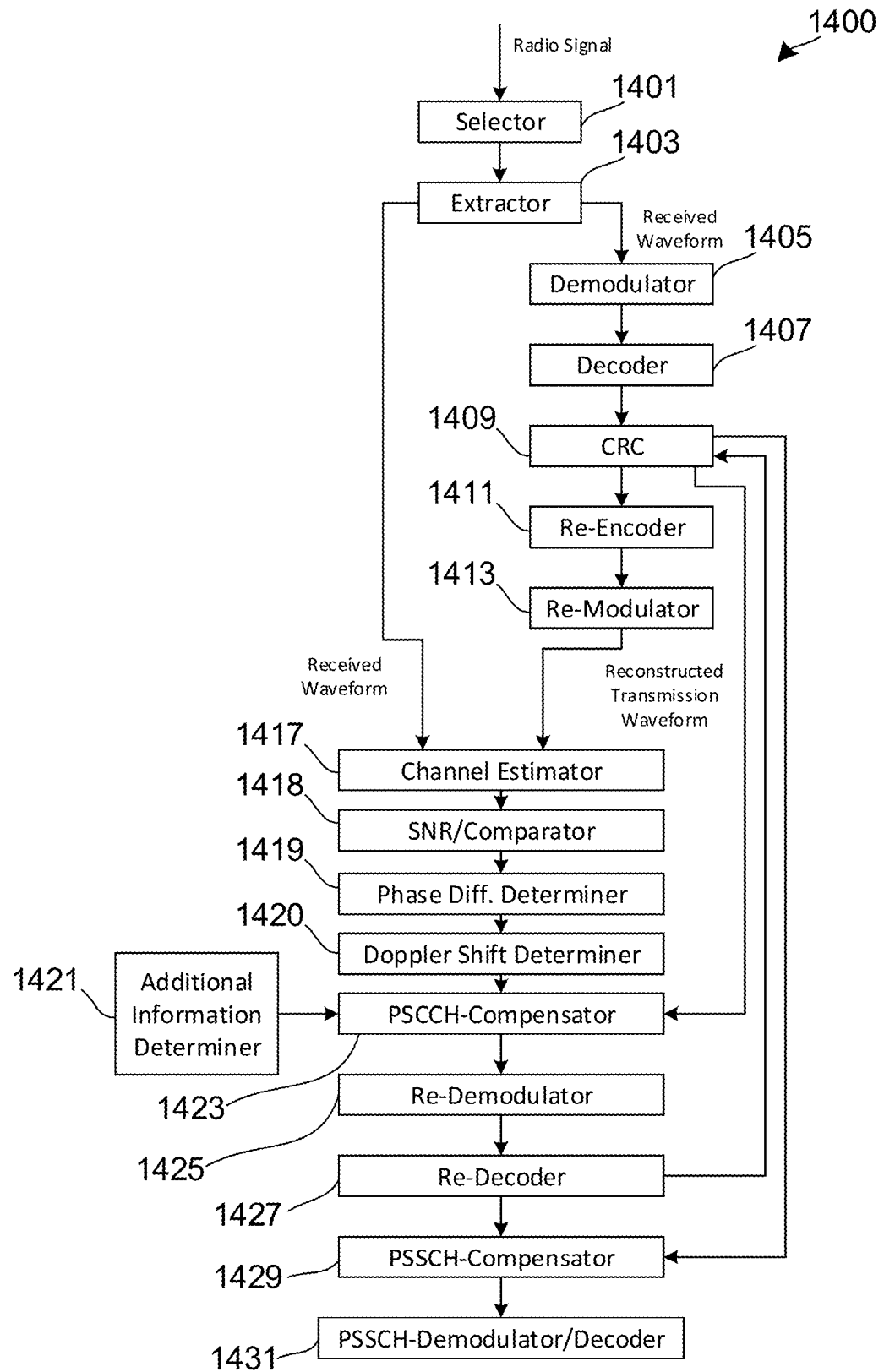
FIG. 14 shows an exemplary internal configuration of a communication device related to Doppler shift estimation and control channel false positive rate reduction in accordance with various aspects.

As illustrated, if the determined SNR is smaller than the second threshold TH2, which may correspond to a practical threshold set based on expected SNR values, the communication device 1200 discards the payload data demodulated and decoded from the received waveform ("N" at stage 1321). In other words, by providing the SNR-determiner/ comparator 1218, a further filter is provided that may allow to determine a PSCCH codeword that has passed a CRC check at stage 1307 (corresponding to stage 1007 in FIG. 10) to be a false positive if an SNR-value is determined to be unrealistically small. For example, the threshold Th2 may be set of −10 dB and may be a predefined value. [0077] FIG. 14 shows a communication device 1400 corresponding to the communication device 900 of FIG. 9 or to the communication device 1200 of FIG. 12, where components correspondingly labelled correspond to those described above in the context of FIG. 9 and of FIG. 12. In other words, an explicit description of selector 1401, extractor 1403, demodulator 1405, decoder 1407, redundancy checker CRC 1409, re-encoder 1411, re-modulator 1413, channel estimator 1417, SNR-determiner/comparator 1418, phase difference determiner 1419, Doppler shift determiner 1420, PSSCH-compensator 1429 and of PSSCH-demodulator/decoder 1431 is omitted here for conciseness purposes. In addition to the components illustrated in FIG. 12, a communication device 1400 may in accordance with various aspects of the present disclosure further include an additional information determiner 1421, a PSCCH-compensator 1423, a re-demodulator 1425, and a re-decoder 1427.

The additional information determiner 1421, the PSCCH-compensator 1423, the re-demodulator 1425, and the re-decoder 1427 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. While additional information determiner 1421, PSCCH-compensator 1423, re-demodulator 1425, and re-decoder 1427 are shown separately in FIG. 14, this depiction generally serves to highlight the operation of baseband modem 206 or DSP 604 on a functional level. Additional information determiner 1421, PSCCH-compensator 1423, re-demodulator 1425, and re-decoder 1427 can therefore each be implemented as separate hardware and/or software components, or one or more of additional information determiner 1421, PSCCH-compensator 1423, re-demodulator 1425, and re-decoder 1427 can be combined into a unified hardware and/or software component (for example, a hardware-defined circuitry arrangement including circuitry to perform multiple functions, or a processor configured to execute program code that defines instructions for multiple functions)

Figure 15:
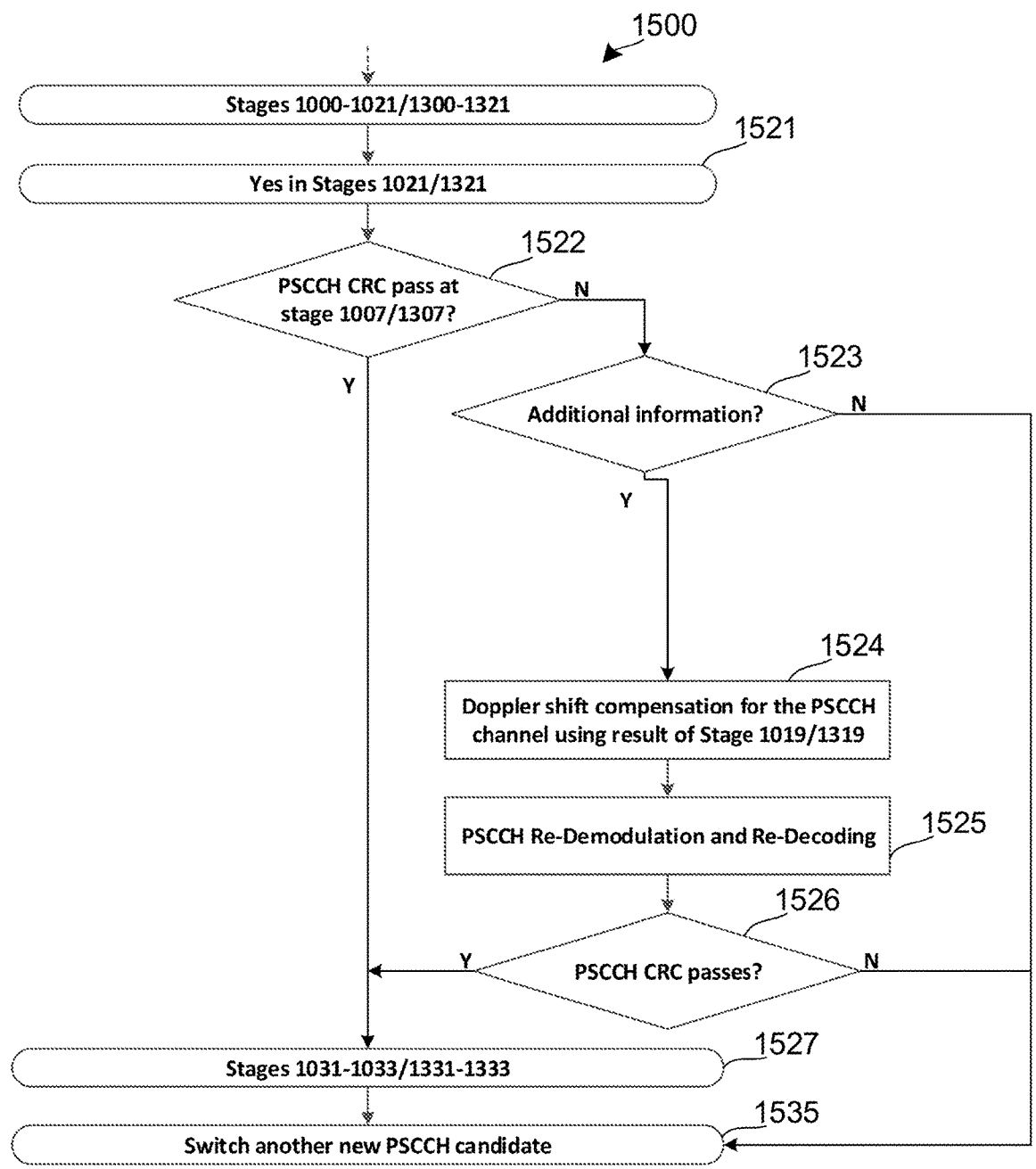
FIG. 15 shows an exemplary method which the communication device may execute in accordance with some aspects using the internal configuration shown in FIG. 14.

FIG. 15 shows exemplary method 1500, which communication device 1400 may execute using the internal configuration shown in FIG. 14. The additional information determiner 1421 illustrated in FIG. 14 may determine presence of additional information based on the received radio signal after the radio signal is received at the communication device (i.e., at any stage before or after stages 1001,1301). In accordance with various aspects, the additional information determiner 1421 may e.g., determine additional information as a-priori information based on the received radio signal, this received radio signal being received from at least one base station. The a-priori information may in certain aspects thus be obtained as base station configuration information transmitted from a base station to the communication device 1400. The communication device 1400 may at least for reception of the a-priori information operate in V2X non-autonomous operation mode, where the at least one base station acts as central control node. After reception of this information the communication device 1400 may continue to operate in V2X non-autonomous operation mode or may switch to V2X autonomous operation mode and use the a-priori information when communicating with one or more further communication device(s).

In alternative or additional aspects, the additional information determiner may determine the additional information by predicting additional information from a PSCCH allocation history, the PSCCH included in a radio signal previously received from a further communication device. As mentioned above, for example in V2X sidelink communications, a radio signal transmitted and received between communication devices in V2X autonomous operation mode without a base station acting as central control node may include PSCCHs and PSSCHs from for example up to 20 communication nodes. By decoding PSCCH codewords included in a received radio signal, each communication device in V2X autonomous operation mode can obtain the SCI from each other communication device which includes grant information for the PSSCH associated to the PSCCH which included the SCI. The communication device derives from said grant information whether or not and how to decode the associated PSSCH. Such grant information (or information based thereon) may be stored at the communication device and may in certain aspects be used as additional information (history information) in one or more subsequent sub-frames or TTIs.

In various aspects, such additional information can be employed to overrule the result of redundancy checkers CRC 909, 1209 discussed above. In other words, in accordance with various aspects, the payload data processor may be configured to reconstruct the transmission waveform of the first payload data based on the additional information even if the redundancy tester does not confirm the received first payload data. Thus, even though decoding performance may not be optimal and e.g., a CRC is not passed, in cases where, based on the additional information it can be ascertained that the currently selected radio resources include PSCCH and PSSCH information, Doppler shift compensation in accordance with various aspects of the present disclosure may be employed for improving the signal quality as explained in detail in the following with reference to FIG. 15.

As illustrated, method 1500 may be employed after stages 1001 to 1021 or stages 1301 to 1321 of methods 1000, 1300 have been executed. The communication device 1400 may then at stage 1521 check if a Doppler shift estimated at stage 1021 or 1321 is smaller than the first threshold Th1, i.e., if the estimated Doppler shift corresponds to a realistic relative velocity e.g., between V2X transmitter (a further communication device) and V2X receiver (the communication device). If the estimated Doppler shift is below the first threshold Th1, the communication device checks if SCI has been decoded correctly from the currently selected PSCCH candidate. If the corresponding redundancy check had been passed ("Y" at stage 1522), the method proceeds at stages 1031-1033 or 1331-1333 discussed above.

If the corresponding redundancy check had not been passed ("N" at stage 1522), the additional information determiner 1421 checks if additional information is present. If no additional information is present ("N" at stage 1523), the method proceeds at stage 1535, i.e., a new PSCCH candidate is selected.

If additional information is present ("Y" at stage 1523), the method proceeds at stage 1524 where the PSCCH compensator 1423 processes the received waveform of the current PSCCH candidate to compensate the Doppler shift of said PSCCH using the Doppler shift estimated at stages 1019 or 1319. In other words, in accordance with various aspects, the compensator is configured to compensate the Doppler shift of the received waveform of payload data extracted by the extractor from the first radio resource to generate a compensated received waveform, based on the Doppler shift determined by the Doppler shift determiner.

Based on the compensated received waveform, the re-demodulator 1425 and the re-decoder 1427 re-demodulate and re-decode the compensated received PSCCH waveform at stage 1525 to extract compensated payload data at stage 1525. Redundancy checker 1409 checks the compensated payload data at stage 1226. If correct decoding of the compensated received waveform is not confirmed ("N" at stage 1226), the method 1500 proceeds to stage 1535 where a new PSCCH candidate is selected. If correct decoding of the compensated received waveform is confirmed ("Y" at stage 1226), the method 1500 proceeds to either stages 1031-1033 of method 1000 or to stages 1331-1333 of method 1300 at stage 1527. In other words, when additional information ascertains that SCI information is present in a received radio signal, Doppler shift estimation based on adjacent PSCCH data symbols in accordance with aspects of the present disclosure is employed to improve quality of a received waveform of PSCCH payload data, the decoding of which firstly has not passed CRC. If the improved PSCCH is confirmed to be true by the redundancy checker 1409, presence of SCI and corresponding PSSCH grant information is also confirmed. Therefore, the Doppler shift used at stage 1524 for improving the current PSCCH candidate can be used to compensate for a Doppler shift present in the associated PSSCH (stages 1031-1033 of method 1000 or to stages 1331-1333 of method 1300).

As a result, in certain aspects, based on the additional information and by employing the Doppler shift compensation on the PSCCH to generate an improved PSCCH candidate at stages 1524, 1525 and 1226, non-optimally decoded PSCCH information bits can be recovered even though an initial redundancy check (stages 1007, 1307) was not passed. From the so recovered PSCCH grant information for the associated PSSCH can be derived to determine whether or not and how to decode the associated PSSCH.

With respect to FIG. 10, step 1021, and according to one aspect of the disclosure, the predetermined threshold (Th1), which is used to compare a Doppler shift estimation from the PSCCH payload data signal, can be determined based on:

$$Th1 = \frac{V\_max}{C\_light} \cdot f + \Delta \quad (4)$$

wherein C_light is the speed for electromagnetic wave propagation; V_max is the assumed maximal possible relative speed between two vehicles; $f$ is the carrier frequency at which the two vehicles are communicated; and Δ is the extra margin for estimation errors. That is, the predetermined threshold for comparison may be a function that includes the frequency and the anticipated maximum relative velocity of the vehicles (V_max).

According to one aspect of the disclosure, V_max could be a pre-defined value, such as, for example, a pre-defined worst-case value (e.g., 500 km/h), or any other predetermined value, without limitation. The predetermined value may be set higher or lower to alter the likelihood of false positive detection or otherwise to achieve a desired end. Alternatively, or additionally, the predetermined threshold may be selected based on the actual maximum permitted velocity for the current geographical or jurisdictional region where the vehicle/communication device is present. In such a configuration, the device may be configured to receive from one or more other sensors and/or from one or more other processors, information corresponding to a speed limit, a maximum safe speed, or other information pertaining to a maximum anticipated velocity of the vehicle. For example, and depending on the country in which the system is used, within a municipality or other built-up area, the actual maximum permissible velocity for a single vehicle could be up to 50 km/hour or 35 miles/hour. On a highway, the maximum anticipated speed for a single vehicle could be 100 km/hour or more. In some jurisdictions, vehicles may be permitted to drive at 130 km/hour, 150 km/hour, 180 km/hour, 200 km/hour, or any other velocity that may be reasonable under the circumstances. In areas without an upper speed limit, a predetermined maximum anticipated velocity may be selected based on any desired criteria.

Whatever the maximum anticipated speed of a single vehicle, it may be doubled to determine a maximum anticipated relative speed of two vehicles. That is, two vehicles traveling in opposite directions should, ideally, have a maximum relative velocity of no more than twice the local speed limit. For example, where the speed limit is 50 km/hour, the maximum relative speed (V_max) would be 100 km/hour. The actual maximum permissible speed information within a geographical region could be extracted from the negation systems within a vehicle and provided to the V2X modem processor. As a result, the PSCCH false positive rate can be further reduced for a geographical region with lower maximum permissible speed because Th1 is lower. When the actual maximum permissible speed information is not available, the system could fallback to use the worst-case speed, i.e., 500 km/h.

Moreover, and depending on the desired outcome, the predetermined threshold may be selected to include a buffer above twice the relevant speed limit. This may be selected based on an expectation that vehicles may frequently travel somewhat faster than the posted speed limit, and by marginally increasing the predetermined threshold to account for a buffer above the posted speed limit, it may be possible to eliminate a number of unnecessarily rejected Doppler shift comparisons. If the speed of the own vehicle is known e.g., from a speed meter or a GNSS (satellite) positioning system or via another source, then the maximum admissible Doppler shift and consequently the to be used threshold can be calculated from the known own speed and an estimate of the speed of the other vehicle according to any of the above-mentioned alternatives.

Regarding FIG. 10, elements 1019 and 1021, these elements have combined the reproduced channel transfer functions from the PSCCH data load signals, so as to have derived a single Doppler shift estimation. As a further alternative, multiple Doppler shift estimations can be derived based on different portions of the PSCCH signal (including both PSCCH DMRS and the PSCCH payload signal). As such, the variance of the estimations can also be used to detect a false positive candidate. That is because, for a true PSCCH, the Doppler shifts from different portions of the PSCCH signal are supposed to have a lower variance, but not a dummy PSCCH.

Figure 16:
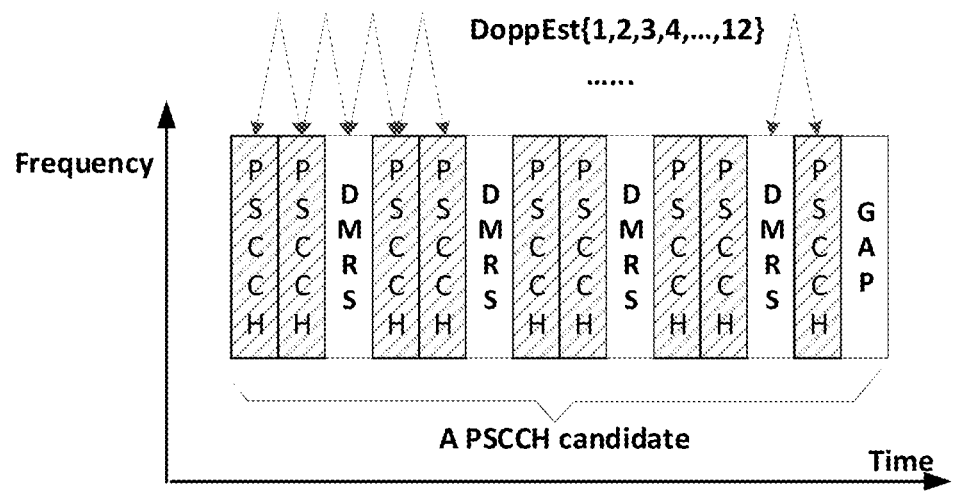
FIG. 16 shows Doppler shift detection using a configuration of PSCCH transmissions interspersed with DMRS transmissions.

This is depicted by the example set forth in FIG. 16. This figure sets forth a configuration of PSCCH transmissions interspersed with DMRS transmissions. In this example, the phase differences of each pair of PSCCH symbols can generate one Doppler shift estimation per pair. This results in in total 12 Doppler shifts estimations, as depicted herein.

The variance (e.g., a standard derivation metric) can be further be calculated and compared with a pre-defined threshold for PSCCH false-positive detection.

Figure 17:
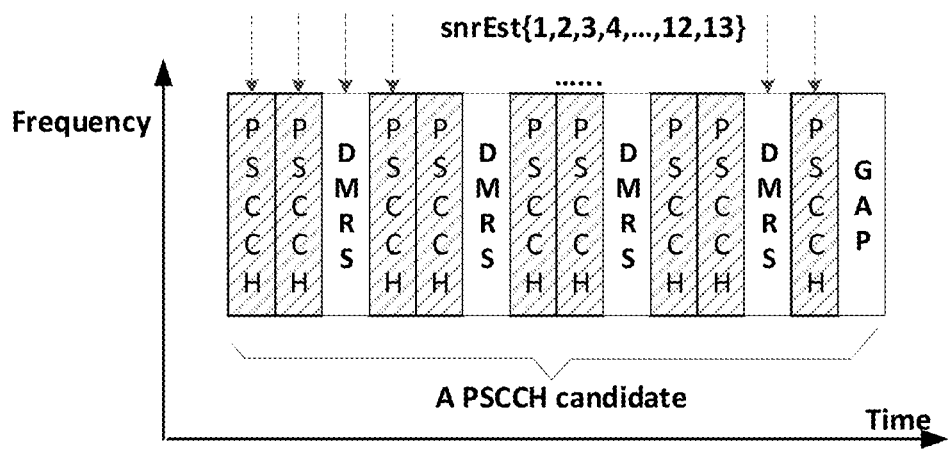
FIG. 17 shows PSCCH payload SNR based false-positive detection, according to an aspect of the disclosure.

The concepts of FIG. 16 can also be extended to PSCCH payload SNR based false-positive detection, as further demonstrated by FIG. 17. The difference is that, for each of the SNR measurements, only a single PSCCH symbol is required, not two. As a result, in total 13 SNR estimations can be collected, whose variance can be further calculated and compared with a pre-defined threshold for PSCCH false-positive detection.

The enhanced Doppler shift estimation from the received control data signal can be further used to improve the TX performance. In this manner, a first vehicle device, which has estimated the Doppler shift based on the previously received data signal from a second vehicle device, could pre-equalize the phase distortions of a further data signal, which may be further transmitted to the second vehicle device.

Figure 18:
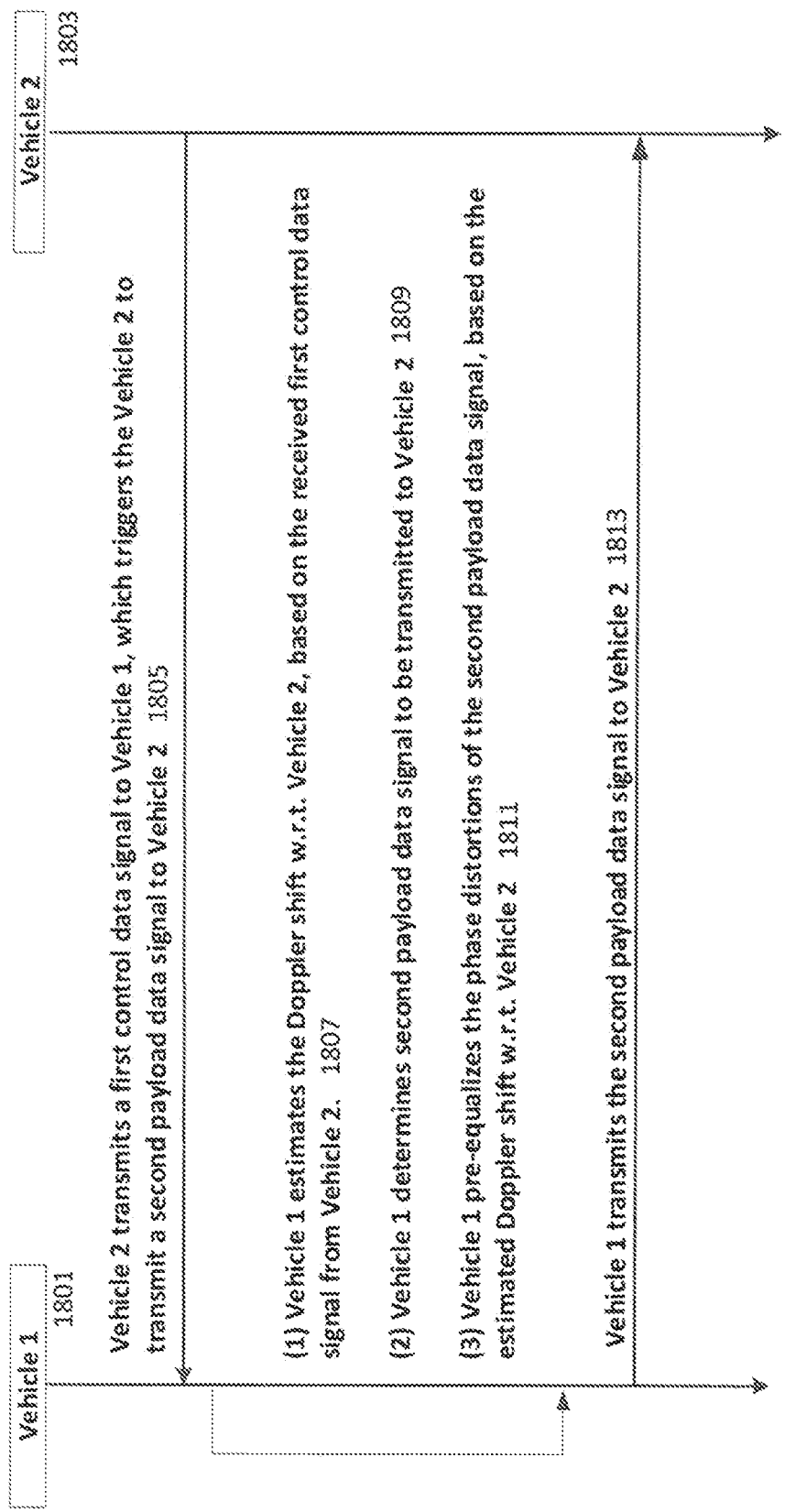
FIG. 18 shows model communications between vehicles, according to an aspect of the disclosure.

FIG. 18 shows communications between vehicle one 1801 and vehicle two 1803 according to an aspect of the disclosure. In this manner, vehicle two 1803 transmits a first control data signal to vehicle one 1801, which triggers vehicle one 1801 to transmit a second payload data signal to vehicle two 1803, 1805. Vehicle one 1801 may then estimate the Doppler shift with respect to vehicle two 1803 based on the received first control data from vehicle two 1803, 1807. Vehicle one 1801 may then determine the second payload data signal to be transmitted to vehicle two 1803, 1809. Vehicle one may pre-equalize the phase distortions of the second payload data signal, based on the estimated Doppler shift with respect to Vehicle 2 1803, 1811. Vehicle one 1801 may then transmit the second payload data signal to vehicle two 1803, 1813.

Figure 19:
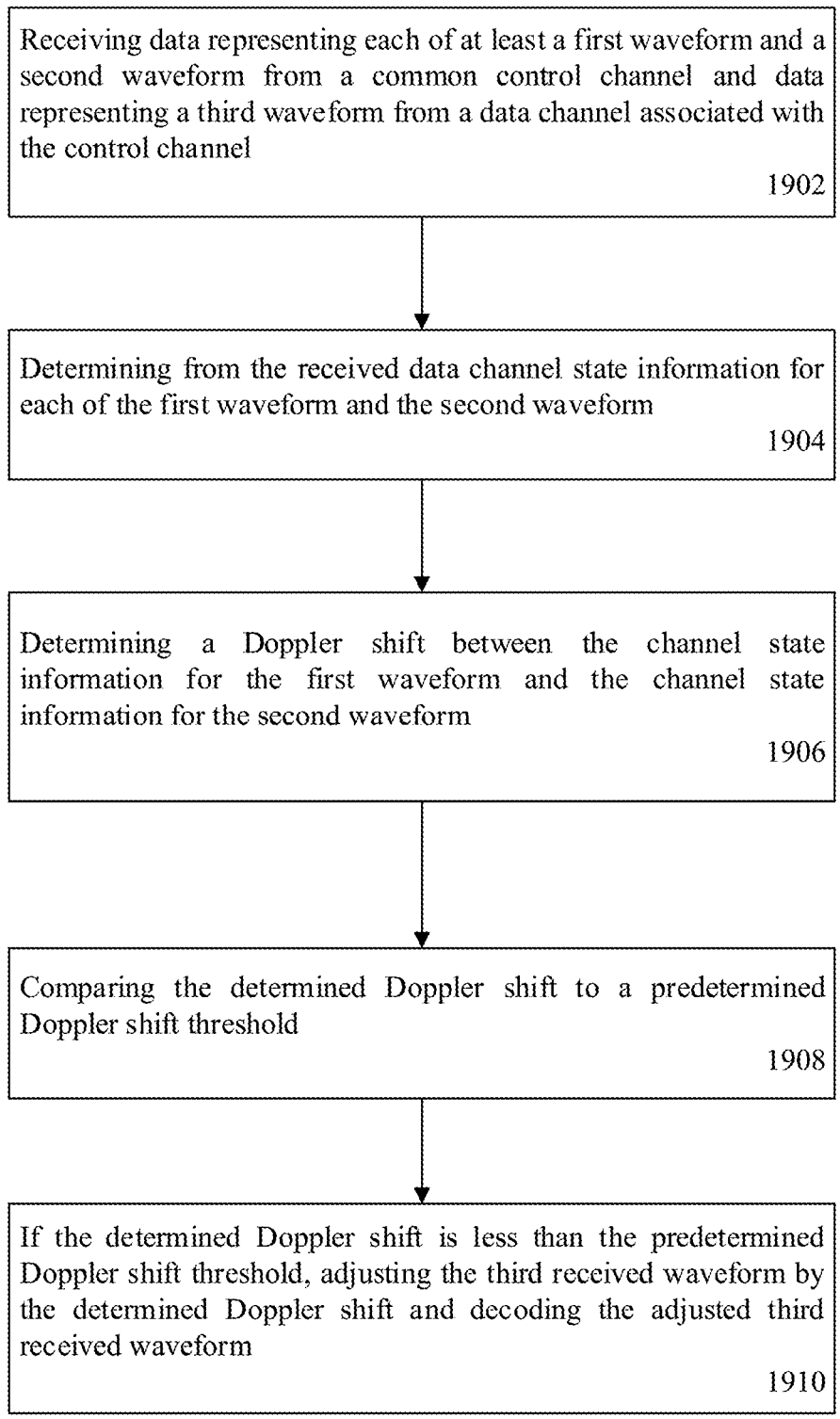
FIG. 19 shows a method of Doppler shift detection.

FIG. 19 depicts a method of Doppler shift detection comprising receiving data representing each of at least a first waveform and a second waveform from a common control channel and data representing a third waveform from a data channel associated with the control channel 1902; determining from the received data channel state information for each of the first waveform and the second waveform 1904; determining a Doppler shift between the channel state information for the first waveform and the channel state information for the second waveform 1906; comparing the determined Doppler shift to a predetermined Doppler shift threshold 1908; and if the determined Doppler shift is less than the predetermined Doppler shift threshold, adjusting the third received waveform by the determined Doppler shift and decoding the adjusted third received waveform 1910.

In this manner, the detected Doppler shift may be utilized not only for identifying false positive PSCCH decodings, but also for improvement of transmission quality. By determining a Doppler-shift, a signal to be transmitted may be pre-equalized to account and correct for any anticipated phase distortions. This may result in improved reception by the other vehicle. The actual pre-equalization may be performed according to any known method of pre-equalization. For example, a frequency shift counteracting at least partly the expected Doppler shift for the reception at the other vehicle can be employed, and the expected Doppler shift at the other vehicle can be estimated based on the observed Doppler shift of signals received form that vehicle. This is a valid estimation because typically the channel is reciprocal i.e., has similar characteristics in both directions.

According to an aspect of the disclosure, the principles and concepts disclosed in FIG. 18 may be adopted to side-link C-V2X based vehicle-to-vehicle communications.

In this manner, the first control data signal can be a PSCCH while the second payload data signal can be a PSSCH, which is triggered by vehicle two. Furthermore, this concept can also be extended to a mobile edge computing scenario, wherein the first vehicle device (e.g., vehicle one) can be a moving UE device, while the second vehicle device can be a moving base station (e.g., vehicle two). For the latter case, the first control data signal in FIG. 18 can then be a PDCCH, while the second payload data signal in FIG. 4 can be a PUSCH, which is triggered to be transmitted to the moving base station by the received PDCCH.

In certain further aspects, reproduced channel transfer function on PSCCH data-subcarriers can be further employed in a similar way as described above for Doppler shift estimation, in certain aspects combined with DMRS, for estimation of further parameters e.g., V2X side-link RSRP measurements, for delay spread estimation, etc., so as to improve the estimation accuracy in low SINR conditions.

A variety of configurations may be possible, with respect to the third waveform. The one or more processors may be configured to receive a first waveform and a second waveform, and to derive a Doppler shift estimation from the first waveform and the second waveform in the manner described throughout this disclosure. This Doppler shift estimation may be compared to a predetermined threshold for Doppler shift, and further action may be taken based on the results of the Doppler shift comparison. For example, if the Doppler shift estimation is less than the predetermined threshold, the Doppler shift estimation may be used to adjust a received third waveform. According to one aspect of the disclosure, the third waveform may be received along with the first waveform and/or the second waveform.

According to another aspect of the disclosure, the third waveform may be received before or after receiving the first waveform and/or second waveform. According to another aspect of the disclosure, the third waveform may be received only in the case that the estimated Doppler shift from the first waveform and the second waveform is less than the predetermined Doppler shift threshold.

According to another aspect of the disclosure, the one or more processors may be configured to estimate two Doppler shifts and to compare two estimated Doppler shifts to one another for consistency. Although estimated Doppler shifts between successively received waveforms may be expected to be different, such estimated Doppler shifts may be expected to be within a predetermined variance of one another. By comparing two estimated Doppler shifts from waveforms received close in time to one another, the two estimated Doppler shifts may be compared, and the difference in the estimated Doppler shifts may be compared to a maximum variance or a predetermined variance threshold. If a difference between the estimated Doppler shifts exceed the predetermined variance threshold, then one or both of the estimated Doppler shifts may be assumed to be a false positive and/or may be discarded.

The following examples pertain to further aspects of this disclosure:

The subject matter of Example 1 is a communication device comprising an extractor configured to extract a received claimed waveform of payload data including at least first payload data and second payload data from a received radio signal; a payload data processor configured to reconstruct a transmission waveform of the first payload data and a transmission waveform of the second payload data; a channel estimator configured to estimate a channel transfer function for each of the first payload data and the second payload data, based on the reconstructed transmission waveform and the extracted received waveform; and a phase difference determiner configured to determine a phase difference between the channel transfer function estimated for the first payload data and the channel transfer function estimated for the second payload data.

In Example 2, the subject matter of Example 1 can optionally include wherein the extractor is configured to extract the received waveform from a first radio resource selected from predefined radio resources.

In Example 3, the subject matter of any one of Examples 1 or 2 can optionally include wherein the payload data processor is configured to demodulate and decode the received waveform to extract the payload data, and to re-encode and re-modulate the extracted payload data to reconstruct at least the transmission waveforms of the first payload data and the second payload data, respectively.

In Example 4, the subject matter of any one of Examples 1 to 3 can optionally include further comprising a Doppler shift determiner configured to determine a Doppler shift based on the determined phase difference; and a compensator configured to compensate a Doppler shift of a waveform of payload data extracted from a second radio resource selected from the predefined radio resources and different from the first radio resource, based on the determined Doppler shift.

In Example 5, the subject matter of any one of Examples 1 to 4 can optionally include wherein the received radio signal includes at least one Transmission Time Interval (TTI), and wherein the at least first payload data and second payload data are included in the TTI adjacent in time.

In Example 6, the subject matter of any one of Examples 1 to 5 can optionally include wherein the at least first payload data and second payload data correspond to first and second data symbols of a Physical Sidelink Control Channel (PSCCH), respectively.

In Example 7, the subject matter of any one of Examples 1 to 6 can optionally include wherein the received radio signal further includes at least two Demodulation Reference Signal (DMRS) symbols, and wherein at least one of the at least first payload data and second payload data are temporally adjacent to one of the at least two DMRS symbols.

In Example 8, the subject matter of any one of Examples 1 to 7 can optionally include wherein the payload data including the at least first payload data and second payload data corresponds to Sidelink Control Information (SCI).

In Example 9, the subject matter of any one of Examples 4 to 8 can optionally include wherein the payload data of a waveform extracted from the second radio resource includes payload data of a Physical Sidelink Shared Channel (PSSCH) associated to the PSCCH.

In Example 10, the subject matter of any one of Examples 4 to 9 can optionally include further comprising a first comparator configured to compare the determined Doppler shift to a first threshold; wherein the payload data processor is configured to discard a Physical Sidelink Shared Channel (PSSCH) associated to the PSCCH if the first comparator determines the determined Doppler shift to be above the first threshold.

In Example 11, the subject matter of any one of Examples 4 to 10 can optionally include further comprising a redundancy checker configured to confirm or discard the payload data demodulated and decoded from the received waveform by the payload data processor based on a redundancy check; a first comparator configured to compare the determined Doppler shift to a first threshold; wherein the payload data processor is configured to discard the demodulated and decoded payload data if the first comparator determines the determined Doppler shift to be above the first threshold even if the payload data has been confirmed by the redundancy checker.

In Example 12, the subject matter of any one of Examples 1 to 11 can optionally include further comprising an SNR-determiner configured to determine a Signal-to-Noise-Ratio (SNR) based on at least one of the channel transfer functions estimated for one of the first payload data and the second payload data based on the respective reconstructed transmission waveform and the respective extracted received waveform; and a second comparator configured to compare the determined SNR to a second threshold, wherein the payload data processor is configured to discard the payload data demodulated and decoded from the received waveform by the payload data processor if the second comparator determines the determined SNR to be below the second threshold.

In Example 13, the subject matter of Example 12 can optionally include wherein the channel estimator is further configured to estimate at least one channel transfer function based on at least one received Demodulation Reference Signal (DMRS) waveform; and wherein the SNR-determiner is configured to determine the Signal-to-Noise-Ratio (SNR) based on at least one of the channel transfer functions estimated for one of the first payload data and the second payload data based on the respective reconstructed transmission waveform and the respective extracted received waveform, and based on the at least one channel transfer function estimated from the at least one received Demodulation Reference Signal waveform.

In Example 14, the subject matter of any one of Examples 1 to 13 can optionally include further comprising an SNR-determiner configured to determine a Signal-to-Noise-Ratio (SNR) based on at least one of the channel transfer functions estimated for one of the first payload data and the second payload data based on the respective reconstructed transmission waveform and the respective extracted received waveform; a second comparator configured to compare the determined SNR to a second threshold; and a redundancy checker configured to confirm or discard the payload data demodulated and decoded from the received waveform by the payload data processor based on a redundancy check, wherein the payload data processor is configured to discard the payload data demodulated and decoded from the received waveform by the payload data processor if the second comparator determines the determined SNR to be below the second threshold, even if the payload data is confirmed by the redundancy checker.

In Example 15, the subject matter of Example 14 can optionally include wherein the channel estimator is further configured to estimate at least one channel transfer function based on at least one received Demodulation Reference Signal (DMRS) waveform; and wherein the SNR-determiner is configured to determine the Signal-to-Noise-Ratio (SNR) based on at least one of the channel transfer functions estimated for one of the first payload data and the second payload data based on the respective reconstructed transmission waveform and the respective extracted received waveform, and based on the at least one channel transfer function estimated from the at least one received Demodulation Reference Signal waveform.

In Example 16, the subject matter of any one of Examples 1 to 15 can optionally include further comprising a redundancy checker configured to confirm or discard the payload data demodulated and decoded from the received waveform by the payload data processor based on a redundancy check; wherein the payload data processor is configured to reconstruct a transmission waveform of the first payload data and a transmission waveform of the second payload data if the redundancy checker confirms the received payload data.

In Example 17, the subject matter of Example 16 can optionally include further comprising an additional information determiner configured to determine presence of additional information, wherein the payload data processor is configured to reconstruct the transmission waveform at least of the first payload data based on the additional information even if the redundancy checker discards the received first payload data.

In Example 18, the subject matter of Example 17 can optionally include wherein the compensator is configured to compensate a Doppler shift of the received waveform of payload data extracted by the extractor from the first radio resource to generate a compensated received waveform based on the Doppler shift determined by the Doppler shift determiner; wherein the payload data processor is configured to re-demodulate and re-decode the compensated received waveform to extract compensated payload data; wherein the redundancy checker is configured to confirm or discard the compensated payload data based in a redundancy check; and wherein the compensator is configured to compensate a Doppler shift of a waveform of payload data extracted from a second radio resource selected from the predefined radio resources and different from the first radio resource, based on the determined Doppler shift, if the redundancy checker confirms the compensated payload data.

In Example 19, the subject matter of any one of Examples 17 or 18 can optionally include wherein the additional information is a-priori information received in the received radio signal from at least one base station.

In Example 20, the subject matter of any one of Examples 17 or 18 can optionally include wherein the additional information is information predicted by the payload data processor from a PSCCH allocation history, the PSCCH included in a radio signal previously received from at least one further communication device.

In Example 21, the subject matter of any one of Examples 1 to 20 can optionally include wherein the radio signal is received from at least one further communication device.

In Example 22, the subject matter of any one of Examples 1 to 21 can optionally include wherein the radio signal is received from at least one base station.

In Example 23, the subject matter of any one of Examples 1 to 22 can optionally include wherein the communication device is a communication device for vehicular communications.

In Example 24, the subject matter of any one of Examples 1 to 23 can optionally include wherein the communication device is configured to operate in accordance with vehicular communication technology, wherein the vehicular communication technology is a Long Term Evolution (LTE) Vehicle-to-Vehicle (V2V) or Vehicle-to-Everything (V2X) radio communication technology.

Example 25 is a communication method comprising extracting a received waveform of payload data including at least first payload data and second payload data from a received radio signal; reconstructing a transmission waveform of the first payload data and a transmission waveform of the second payload data; estimating a channel transfer function for each of the first payload data and the second payload data, based on the reconstructed transmission waveform and the extracted received waveform; and determining a phase difference between the channel transfer function estimated for the first payload data and the channel transfer function estimated for the second payload data.

In Example 26, the subject matter of Example 25 can optionally include wherein the extracting extracts the received waveform from a first radio resource selected from predefined radio resources.

In Example 27, the subject matter of any one of Examples 25 or 26 can optionally include further comprising demodulating and decoding the received waveform to extract the payload data; re-encoding and re-modulating the extracted payload data to reconstruct at least the transmission waveforms of the first payload data and the second payload data, respectively.

In Example 28, the subject matter of any one of Examples 25 to 27 can optionally include further comprising determining a Doppler shift based on the determined phase difference; and compensating a Doppler shift of a waveform of payload data extracted from a second radio resource selected from the predefined radio resources and different from the first radio resource, based on the determined Doppler shift.

In Example 29, the subject matter of any one of Examples 25 to 28 can optionally include wherein the received radio signal includes at least one Transmission Time Interval (TTI), and wherein the at least first payload data and second payload data are included in the TTI adjacent in time.

In Example 30, the subject matter of any one of Examples 25 to 29 can optionally include wherein the at least first payload data and second payload data correspond to first and second data symbols of a Physical Sidelink Control Channel (PSCCH), respectively.

In Example 31, the subject matter of any one of Examples 25 to 30 can optionally include wherein the received radio signal further includes at least two Demodulation Reference Signal (DMRS) symbols, and wherein at least one of the at least first payload data and second payload data are temporally adjacent to one of the at least two DMRS symbols.

In Example 32, the subject matter of any one of Examples 25 to 31 can optionally include wherein the payload data including the at least first payload data and second payload data corresponds to Sidelink Control Information (SCI).

In Example 33, the subject matter of any one of Examples 28 to 32 can optionally include wherein the payload data of a waveform extracted from the second radio resource includes payload data of a Physical Sidelink Shared Channel (PSSCH) associated to the PSCCH.

In Example 34, the subject matter of any one of Examples 28 to 33 can optionally include further comprising comparing the determined Doppler shift to a first threshold; and discarding a Physical Sidelink Shared Channel (PSSCH) associated to the PSCCH if the comparing determines the determined Doppler shift to be above the first threshold.

In Example 35, the subject matter of any one of Examples 28 to 34 can optionally include further comprising confirming or discarding the payload data demodulated and decoded from the received waveform based on a redundancy check; comparing the determined Doppler shift to a first threshold; and discarding the demodulated and decoded payload data if the determined Doppler shift is above the first threshold even if the payload data has been confirmed based on the redundancy check.

In Example 36, the subject matter of any one of Examples 25 to 35 can optionally include further comprising determining a Signal-to-Noise-Ratio (SNR) based on at least one of the channel transfer functions estimated for one of the first payload data and the second payload data based on the respective reconstructed transmission waveform and the respective extracted received waveform; comparing the determined SNR to a second threshold; and discarding the payload data demodulated and decoded from the received waveform if the determined SNR is below the second threshold.

In Example 37, the subject matter of Example 36 can optionally include further comprising estimating at least one channel transfer function based on at least one received Demodulation Reference Signal (DMRS) waveform; and determining the Signal-to-Noise-Ratio (SNR) based on at least one of the channel transfer functions estimated for one of the first payload data and the second payload data based on the respective reconstructed transmission waveform and the respective extracted received waveform, and based on the at least one channel transfer function estimated from the at least one received Demodulation Reference Signal waveform.

In Example 38, the subject matter of any one of Examples 25 to 37 can optionally include further comprising determining a Signal-to-Noise-Ratio (SNR) based on at least one of the channel transfer functions estimated for one of the first payload data and the second payload data based on the respective reconstructed transmission waveform and the respective extracted received waveform; comparing the determined SNR to a second threshold; and confirming or discarding the payload data demodulated and decoded from the received waveform based on a redundancy check; discarding the payload data demodulated and decoded from the received waveform by the payload data processor if the determined SNR is below the second threshold, even if the payload data is confirmed based on the redundancy check.

In Example 39, the subject matter of Example 38 can optionally include further comprising estimating at least one channel transfer function based on at least one received Demodulation Reference Signal (DMRS) waveform; and determining the Signal-to-Noise-Ratio (SNR) based on at least one of the channel transfer functions estimated for one of the first payload data and the second payload data based on the respective reconstructed transmission waveform and the respective extracted received waveform, and based on the at least one channel transfer function estimated from the at least one received Demodulation Reference Signal waveform.

In Example 40, the subject matter of any one of Examples 25 to 39 can optionally include further comprising confirming or discarding the payload data demodulated and decoded from the received waveform based on a redundancy check; and reconstructing a transmission waveform of the first payload data and a transmission waveform of the second payload data if the received payload data is confirmed based on the redundancy check.

In Example 41, the subject matter of Example 40 can optionally include further comprising determining presence of additional information: and reconstructing the transmission waveform at least of the first payload data based on the additional information even if the received first payload data is discarded by the redundancy check.

In Example 42, the subject matter of Example 41 can optionally include further comprising compensating a Doppler shift of the received waveform of payload data extracted from the first radio resource to generate a compensated received waveform based on the determined Doppler shift; re-demodulating and re-decoding the compensated received waveform to extract compensated payload data; confirming or discarding the compensated payload data based on a redundancy check; and compensating a Doppler shift of a waveform of payload data extracted from a second radio resource selected from the predefined radio resources and different from the first radio resource, based on the determined Doppler shift, if the compensated payload data is confirmed based on the redundancy check.

In Example 43, the subject matter of any one of Examples 41 or 42 can optionally include wherein the additional information is a-priori information received in the received radio signal from at least one base station.

In Example 44, the subject matter of any one of Examples 41 or 42 can optionally include wherein the additional information is information predicted from a PSCCH allocation history, the PSCCH included in a radio signal previously received.

In Example 45, the subject matter of any one of Examples 25 to 44 can optionally include wherein the radio signal is received from at least one communication device.

In Example 46, the subject matter of any one of Examples 25 to 45 can optionally include wherein the radio signal is received from at least one base station.

In Example 47, the subject matter of any one of Examples 25 to 46 can optionally include wherein the communication method is a communication method for vehicular communications.

In Example 48, the subject matter of any one of Examples 25 to 47 can optionally include wherein the communication method is to be employed in accordance with vehicular communication technology, wherein the vehicular communication technology is a Long Term Evolution (LTE) Vehicle-to-Vehicle (V2V) or Vehicle-to-Everything (V2X) radio communication technology.

Example 49 is a wireless device comprising one or more processors; and a memory storing instructions that when executed by the one or more processors cause the one or more processors to perform the method of any one of Examples 25 to 48.

In Example 50, a communication device is disclosed, comprising: one or more processors, configured to receive data representing each of at least a first waveform and a second waveform from a common control channel and data representing a third waveform from a data channel associated with the control channel; determine from the received data, channel state information for each of the first waveform and the second waveform; determine a Doppler shift between the channel state information for the first waveform and the channel state information for the second waveform; compare the determined Doppler shift to a predetermined Doppler shift threshold; and if the determined Doppler shift, and/or the difference between the two Doppler shifts, is less than the predetermined Doppler shift threshold, adjust the third received waveform by the determined Doppler shift and decode the adjusted third received waveform.

In Example 51, the communication device of Example 50 is disclosed, wherein the one or more processors are further configured not to decode the third waveform if the determined Doppler shift is greater than the predetermined Doppler shift threshold.

In Example 52, the communication device of Example 50 or 51 is disclosed, wherein the one or more processors are further configured to discard the third waveform if the determined Doppler shift is greater than the predetermined Doppler shift threshold.

In Example 53, the communication device of any one of Examples 50 to 52 is disclosed, wherein the third waveform is a Physical Sidelink Shared Channel (PSSCH) waveform associated with the first waveform.

In Example 54, the communication device of any one of Examples 50 to 53 is disclosed, wherein determining a channel estimation for each of the first waveform and the second waveform comprises extracting first payload data from the first waveform; extracting second payload data from the second payload data; reconstructing a first transmission waveform from the first payload data; reconstructing a second transmission waveform from the second payload data; and estimating a channel transfer function for the first payload data and the second payload data based on the reconstructed first transmission waveform and the reconstructed second transmission waveform, respectively.

In Example 55, the communication device of any one of Example 50 to 54 is disclosed, further comprising encoding and modulating payload data to represent a fourth waveform, and pre-equalizing the fourth waveform according to the determined Doppler shift.

In Example 56, the communication device of Example 55 is disclosed, further comprising a transmitter, wherein the one or more processors are further configured to control the transmitter to transmit the pre-equalized fourth waveform.

In Example 57, the communication device of any one of Examples 50 to 56 is disclosed, wherein the received data representing the first waveform corresponds to a first radio resource element; the received data representing the second waveform corresponds to a second radio resource element; and wherein first radio resource element and the second radio resource element are adjacent in time.

In Example 58, the communication device of any one of Examples 50 to 57 is disclosed, wherein the received data representing the first waveform and the received data representing the second waveform correspond to first data symbols and second data symbols of a Physical Sidelink Control Channel (PSCCH), respectively.

In Example 59, the communication device of any one of Examples 50 to 57 is disclosed, wherein one of the first waveform or the second waveform corresponds to data symbols of a Physical Sidelink Control Channel (PSCCH), and the other of the first waveform or the second waveform corresponds to data symbols of a Demodulation Reference Signal (DMRS).

In Example 60, the communication device of any one of Examples 50 to 59 is disclosed, wherein the one or more processors are further configured to perform a redundancy check on the received data representing the first waveform, wherein if the received data representing the first waveform passes the redundancy check, the one or more processors are configured to confirm the received data representing the first waveform; and if the received data representing the first waveform fails the redundancy check, the one or more processors are configured to discard the received data representing the first waveform.

In Example 61, the communication device of any one of Examples 50 to 60 is disclosed, wherein the one or more processors are further configured to determine a Signal-to-Noise-Ratio (SNR) based on at least one of the first waveform, the recreated first waveform, the second waveform, or a waveform from which the second waveform was derived, and to compare the determined SNR to a predetermined SNR threshold, and if the determined SNR is smaller than the predetermined SNR threshold is disclosed, to discard the corresponding received data.

In Example 62, the communication device of any one of Examples 50 to 61 is disclosed, wherein the one or more processors are further configured to determine the predetermined Doppler shift threshold based on a relative velocity of the communication device with respect to a transmitter of one of the first waveform or the second waveform. [0165] In Example 63, the communication device of any one of Examples 50 to 62 is disclosed, wherein the one or more processors are further configured to determine a maximum permitted velocity for a vehicle in a vicinity of the communication device, and to determine the predetermined Doppler shift threshold as a multiple of the maximum permitted velocity.

In Example 64, the communication device of any one of Examples 50 to 63 is disclosed, wherein the communication device is configured to operate in accordance with vehicular communication technology, wherein the vehicular communication technology is a Long Term Evolution (LTE) Vehicle-to-Vehicle (V2V) or Vehicle-to-Everything (V2X) radio communication technology.

In Example 65, the communication device of any one of Examples 50 to 64 is disclosed, wherein adjusting the third received waveform by the determined Doppler shift comprises receiving the third waveform and compensating a phase of the received third waveform according to the determined Doppler shift.

In Example 66, a method of Doppler shift detection is disclosed comprising: receiving data representing each of at least a first waveform and a second waveform from a common control channel and data representing a third waveform from a data channel associated with the control channel; determining from the received data channel state information for each of the first waveform and the second waveform; determining a Doppler shift between the channel state information for the first waveform and the channel state information for the second waveform; comparing the determined Doppler shift to a predetermined Doppler shift threshold; and if the determined Doppler shift is less than the predetermined Doppler shift threshold, adjusting the third received waveform by the determined Doppler shift and decoding the adjusted third received waveform.

In Example 67, the method of Doppler shift detection of Example 66 is disclosed, further comprising discarding the data representing the first waveform if the determined Doppler shift is greater than the predetermined Doppler shift threshold.

In Example 68, the method of Doppler shift detection of Example 66 or 67 is disclosed, further comprising discarding a Physical Sidelink Shared Channel (PSSCH) waveform associated with the first waveform if the determined Doppler shift is greater than the predetermined Doppler shift threshold.

In Example 69, the method of Doppler shift detection of any one of Examples 66 to 68 is disclosed, further comprising encoding and modulating payload data to represent a fourth waveform, and pre-equalizing the fourth waveform according to the determined Doppler shift.

In Example 70, the method of Doppler shift detection of Example 69 is disclosed, further comprising transmitting the pre-equalized fourth waveform.

In Example 71, the method of Doppler shift detection of any one of Examples 66 to 70 is disclosed, further comprising determining the predetermined Doppler shift threshold based on a relative velocity of a communication device with respect to a transmitter of one of the first waveform or the second waveform.

In Example 72, the method of Doppler shift detection of any one of Examples 66 to 71 is disclosed, further comprising determining a maximum permitted velocity for a vehicle, and determining the predetermined Doppler shift threshold as a multiple of the maximum permitted velocity.

In Example 73, a non-transient computer readable medium is disclosed, configured to cause one or more processors to perform the method of any one of Examples 66 to 71. [0176] In Example 74, a communication device is disclosed, comprising one or more processors, configured to receive data representing each of at least a first waveform and a second waveform from a common control channel; determine from the received data, channel state information for each of the first waveform and the second waveform; determine a Doppler shift between the channel state information for the first waveform and the channel state information for the second waveform; compare the determined Doppler shift to a predetermined Doppler shift threshold; and if the determined Doppler shift is less than the predetermined Doppler shift threshold, adjust received data representing a third waveform from a data channel associated with the control channel by the determined Doppler shift and decode the adjusted third received waveform.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
   a memory; and
   one or more processors in communication with the memory, wherein the one or more processors are configured to:
   receive data representing each of at least a first waveform and a second waveform from a common control channel;
   determine from the received data, channel state information for each of the first waveform and the second waveform;
   determine a Doppler shift between the channel state information for the first waveform and the channel state information for the second waveform;
   compare the determined Doppler shift to a predetermined Doppler shift threshold; and
   if the determined Doppler shift is less than the predetermined Doppler shift threshold, adjust received data representing a third waveform from a data channel associated with the control channel by the determined Doppler shift and decode the adjusted third received waveform.

2. The communication device of claim 1, wherein if the determined Doppler shift is greater than the predetermined Doppler shift threshold, the one or more processors are further configured to refrain from decoding the third waveform.

3. The communication device of claim 1, wherein the one or more processors are further configured to discard the third waveform if the determined Doppler shift is greater than the predetermined Doppler shift threshold.

4. The communication device of claim 1, wherein the third waveform is a Physical Sidelink Shared Channel (PSSCH) waveform associated with the first waveform.

5. The communication device of claim 1, wherein determining a channel estimation for each of the first waveform and the second waveform comprises:
   extracting first payload data from the first waveform; extracting second payload data from the second payload data; reconstructing a first transmission waveform from the first payload data;
   reconstructing a second transmission waveform from the second payload data; and
   estimating a channel transfer function for the first payload data and the second payload data based on the reconstructed first transmission waveform and the reconstructed second transmission waveform, respectively.

6. The communication device of claim 1, further comprising:
   encoding and modulating payload data to represent a fourth waveform; and
   pre-equalizing the fourth waveform according to the determined Doppler shift.

7. The communication device of claim 1, wherein the received data representing the first waveform corresponds to a first radio resource element; wherein the received data representing the second waveform corresponds to a second radio resource element; and
   wherein the first radio resource element and the second radio resource element are adjacent in time.

8. The communication device of claim 1, wherein the received data representing the first waveform and the received data representing the second waveform correspond to first data symbols and second data symbols of a Physical Sidelink Control Channel (PSCCH), respectively.

9. The communication device of claim 1, wherein one of the first waveform or the second waveform corresponds to data symbols of a Physical Sidelink Control Channel (PSCCH), and the other of the first waveform or the second waveform corresponds to data symbols of a Demodulation Reference Signal (DMRS).

10. The communication device claim 1, wherein the one or more processors are further configured to perform a redundancy check on the received data representing the first waveform;
    wherein, if the received data representing the first waveform passes the redundancy check, the one or more processors are configured to confirm the received data representing the first waveform; and wherein, if the received data representing the first waveform fails the redundancy check, the one or more processors are configured to discard the received data representing the first waveform.

11. The communication device of claim 1,
wherein the one or more processors are further configured to:
  determine a Signal-to-Noise-Ratio (SNR) based on at least one of the first waveform, the recreated first waveform, the second waveform, or a waveform from which the second waveform was derived;
  compare the determined SNR to a predetermined SNR threshold; and
  if the determined SNR is lower than the predetermined SNR threshold, to discard the corresponding received data.

12. The communication device of claim 1,
wherein the one or more processors are further configured to determine the predetermined Doppler shift threshold based on a relative velocity of the communication device with respect to a transmitter of one of the first waveform or the second waveform.

13. The communication device of claim 1,
wherein the one or more processors are further configured to:
  determine a maximum permitted velocity for a vehicle in a vicinity of the communication device; and
  determine the predetermined Doppler shift threshold as a multiple of the maximum permitted velocity.

14. The communication device of claim 1,
wherein adjusting the third received waveform by the determined Doppler shift comprises receiving a third waveform and compensating a phase of the received third waveform according to the determined Doppler shift.

15. A method of Doppler shift detection, comprising:
receiving data representing each of at least a first waveform and a second waveform from a common control channel;
determining, from the received data, channel state information for the first waveform and the second waveform;
determining a Doppler shift between the channel state information for the first waveform and the channel state information for the second waveform;
comparing the determined Doppler shift to a predetermined Doppler shift threshold; and
if the determined Doppler shift is less than the predetermined Doppler shift threshold, adjusting data received representing a third waveform from a data channel associated with the control channel by the determined Doppler shift and decoding the adjusted third received waveform.

16. The method of claim 15, further comprising:
discarding the data representing the first waveform if the determined Doppler shift is greater than the predetermined Doppler shift threshold.

17. The method of claim 15, further comprising:
discarding a Physical Sidelink Shared Channel (PSSCH) waveform associated with the first waveform if the determined Doppler shift is greater than the predetermined Doppler shift threshold.

18. The method of claim 15, further comprising:
encoding and modulating payload data to represent a fourth waveform; and
pre-equalizing the fourth waveform according to the determined Doppler shift.

19. The non-transitory computer readable memory medium storing program instructions executable by one or more processors of a communication device to:
receive data representing each of at least a first waveform and a second waveform from a common control channel;
determine from the received data, channel state information for each of the first waveform and the second waveform;
determine a Doppler shift between the channel state information for the first waveform and the channel state information for the second waveform;
compare the determined Doppler shift to a predetermined Doppler shift threshold; and
if the determined Doppler shift is less than the predetermined Doppler shift threshold, adjust received data representing a third waveform from a data channel associated with the control channel by the determined Doppler shift and decode the adjusted third received waveform.

20. The non-transitory computer readable memory medium of claim 19,
wherein if the determined Doppler shift is greater than the predetermined Doppler shift threshold, the program instructions are further executable by the one or more processors to cause the communication device to refrain from decoding the third waveform.

* * * * *